(12) United States Patent
Nagasaka et al.

(10) Patent No.: US 10,428,714 B2
(45) Date of Patent: Oct. 1, 2019

(54) CONTROL DEVICE AND METHOD FOR INTERNAL COMBUSTION ENGINE

(71) Applicant: TOYOTA JIDOSHA KABUSHIKI KAISHA, Toyota-shi, Aichi (JP)

(72) Inventors: Keisuke Nagasaka, Susono (JP); Hiroshi Tanaka, Susono (JP); Kazuki Tsurumi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 30 days.

(21) Appl. No.: 15/317,204

(22) PCT Filed: Jun. 16, 2015

(86) PCT No.: PCT/JP2015/003012
§ 371 (c)(1),
(2) Date: Dec. 8, 2016

(87) PCT Pub. No.: WO2016/002146
PCT Pub. Date: Jan. 7, 2016

(65) Prior Publication Data
US 2017/0114694 A1 Apr. 27, 2017

(30) Foreign Application Priority Data
Jul. 1, 2014 (JP) .................................. 2014-136192

(51) Int. Cl.
*F01N 9/00* (2006.01)
*F01N 3/24* (2006.01)
(Continued)

(52) U.S. Cl.
CPC ............ *F01N 9/00* (2013.01); *B01D 53/9495* (2013.01); *F01N 3/2013* (2013.01);
(Continued)

(58) Field of Classification Search
CPC ............ B01D 53/9495; F01N 2900/08; F01N 2900/1602; F01N 3/2013; F01N 9/00
See application file for complete search history.

(56) References Cited

U.S. PATENT DOCUMENTS 5,050,565 A * 9/1991 Ishihara .................. F02D 41/10
123/480
5,323,607 A * 6/1994 Tanaka ................... F01N 3/2026
60/274

(Continued)

FOREIGN PATENT DOCUMENTS

CN 103582746 A 2/2014
WO WO 2012164715 A1 * 12/2012 ............. B60K 6/445
WO WO 2013/108379 A1 7/2013

OTHER PUBLICATIONS

WO2013/108379 to Kumagai et al. (Machine Translation).*
Machine Translation of WO2012164715.*

*Primary Examiner* — Audrey K Bradley
*Assistant Examiner* — Anthony Ayala Delgado
(74) *Attorney, Agent, or Firm* — Finnegan, Henderson, Farabow, Garrett & Dunner, LLP

(57) ABSTRACT

According to one aspect of the present invention, there is provided a control device for an internal combustion engine, in which an electric heating catalyst (EHC) having a catalyst support generating heat by energizing is provided to an exhaust passage. The control device includes a control unit configured to energize the support in the case where a rapid change in intake air flow is detected based on an intake air flow of the internal combustion engine or a correlation value of the intake air flow, so as to suppress any occurrence of a crack caused by an increase in difference in temperature between predetermined portions at the support during the rapid change in intake air flow.

16 Claims, 21 Drawing Sheets

(51) Int. Cl.
*F01N 3/20* (2006.01)
*B01D 53/94* (2006.01)
*F01N 3/28* (2006.01)

(52) U.S. Cl.
CPC .............. *F01N 3/2026* (2013.01); *F01N 3/24* (2013.01); *F01N 3/2828* (2013.01); *F01N 2260/10* (2013.01); *F01N 2590/11* (2013.01); *F01N 2900/08* (2013.01); *F01N 2900/1602* (2013.01); *Y02T 10/26* (2013.01); *Y02T 10/47* (2013.01)

(56) References Cited

U.S. PATENT DOCUMENTS

| | | | | |
|---|---|---|---|---|
| 5,819,531 A | * | 10/1998 | Kato | ............... F01N 3/2013 60/277 |
| 9,222,387 B2 | * | 12/2015 | Kumagai | ............... F01N 3/2013 |
| 2014/0290216 A1 | | 10/2014 | Katsuta | |
| 2014/0352283 A1 | | 12/2014 | Kumagai et al. | |

* cited by examiner

CONTROL DEVICE AND METHOD FOR INTERNAL COMBUSTION ENGINE

CROSS-REFERENCE TO RELATED APPLICATIONS

This application is a national phase application of International Application No. PCT/JP2015/003012, filed Jun. 16, 2015, and claims the priority of Japanese Application No. 2014-136192, filed Jul. 1, 2014, the content of both of which is incorporated herein by reference.

TECHNICAL FIELD

The present invention relates to a control device and method for an internal combustion engine.

BACKGROUND ART

A catalyst is disposed on an exhaust passage of an internal combustion engine so as to purify exhaust. Regarding such a catalyst, Patent Literature 1 points out the problem of the possibility of occurrence of a crack on a catalyst support due to an increase in difference in temperature between a side wall surface of the support of an electric heating catalyst and the vicinity of a side wall during acceleration immediately after cold starting of an internal combustion engine. In view of this, a device disclosed in Patent Literature 1 is designed to transit the air-fuel ratio of exhaust toward a rich side during acceleration immediately after cold starting so as to reduce energy of the exhaust in order to suppress an increase in difference in temperature.

CITATION LIST

Patent Literature

PTL1: International Publication No. WO 2013/108379

SUMMARY OF INVENTION

Technical Problem

However, the present inventors made an earnest study, and thus, made new findings that in an internal combustion engine having an electric heating catalyst, a crack possibly occurs on a catalyst support due to an increase in difference in temperature between predetermined portions of the support during both of acceleration and deceleration, particularly, during both of a rapid increase in intake air flow at which an intake air flow is rapidly increased and a rapid decrease in intake air flow at which the intake air flow is rapidly decreased (hereinafter a "rapid increase" and a "rapid decrease" are comprehensively referred to as a "rapid change"). The present inventors found new measures for suppressing an increase in difference in temperature or occurrence of a crack.

The present invention has been created in view of the above-described circumstances. An object of the present invention is to provide a control device and method for an internal combustion engine that can suppress the occurrence of a crack caused by an increase in difference in temperature between predetermined portions of a catalyst support during a rapid change in intake air flow in the internal combustion engine having an electric heating catalyst.

According to an aspect of the present invention, there is provided a control device for an internal combustion engine, in which an electric heating catalyst having a catalyst support generating heat by energizing is disposed on an exhaust passage. The control device includes a control unit configured to energize the support in the case where a rapid change in intake air flow of the internal combustion engine is detected based on the intake air flow or its correlation value.

It is preferable that the control unit should detect the rapid change in intake air flow based on a rate of change of the intake air flow or its correlation value.

It is preferable that the control unit should the support during a predetermined conducting period from the time at which the absolute value of the rate of change of the intake air flow or its correlation value exceeds a predetermined rate threshold. In this case, it is preferable that the control unit should change the conducting period according to the maximum value of the absolute value of the rate of change of the intake air flow or its correlation value.

It is preferable that the control unit should detect the rapid change in intake air flow based on a difference between the intake air flow or its correlation value and a value obtained by averaging the intake air flow or its correlation value. In this case, it is preferable that the control unit should energize the support when the absolute value of the difference exceeds a predetermined differential threshold.

It is preferable that the control unit should perform at least either one of energization to the support when a rapid increase in intake air flow is detected, and thus, a rising rate of the temperature of the support is a predetermined value or higher and the temperature of the support is a predetermined upper limit temperature or lower and of energization to the support when a rapid decrease in intake air flow is detected, and thus, a falling rate of the temperature of the support is a predetermined value or higher and the temperature of the support is a predetermined lower limit temperature or higher.

According to another aspect of the present invention, there is provided a control method for an internal combustion engine, in which an electric heating catalyst having a catalyst support generating heat by energizing is disposed on an exhaust passage. The control method determines whether or not an intake air flow of the internal combustion engine is rapidly changed based on the intake air flow or its correlation value, so as to energize the support in the case where it is determined that the intake air flow is rapidly changed.

In the control method for an internal combustion engine according to the present invention, it is preferable that in the case where the absolute value of the rate of change of the intake air flow or its correlation value exceeds a predetermined rate threshold, it should be determined that that the intake air flow is rapidly changed, and then, the support is energized during a predetermined conducting period from the time at the determination. In this case, it is preferable that the conducting period should depend upon the maximum value of the absolute value of the rate of change of the intake air flow or its correlation value.

It is preferable that it should be determined whether or not the intake air flow is rapidly changed based on a difference between the intake air flow or its correlation value and a value obtained by averaging the intake air flow or its correlation value. It is preferable that it should be determined that the intake air flow is rapidly changed in the case where the absolute value of the difference exceeds a predetermined differential threshold.

The support may be energized in the case where the rapid change in intake air flow is a rapid increase in intake air flow, a rising rate of the temperature of the support is a predetermined value or higher, and the temperature of the support is a predetermined upper limit temperature or lower. Alternatively, the support may be energized in the case where the rapid change in intake air flow is a rapid decrease in intake air flow, the falling rate of the temperature of the support is a predetermined value or higher, and the temperature of the support is a predetermined lower limit temperature or higher.

Advantageous Effects of Invention

The present invention exhibits an excellent effect of suppressing the occurrence of a crack caused by the increase in difference in temperature between the predetermined portions of the catalyst support during the rapid change in intake air flow in the internal combustion engine having the electric heating catalyst.

DESCRIPTION OF EMBODIMENTS

An embodiment will be described below with reference to the attached drawings.

Figure 1:
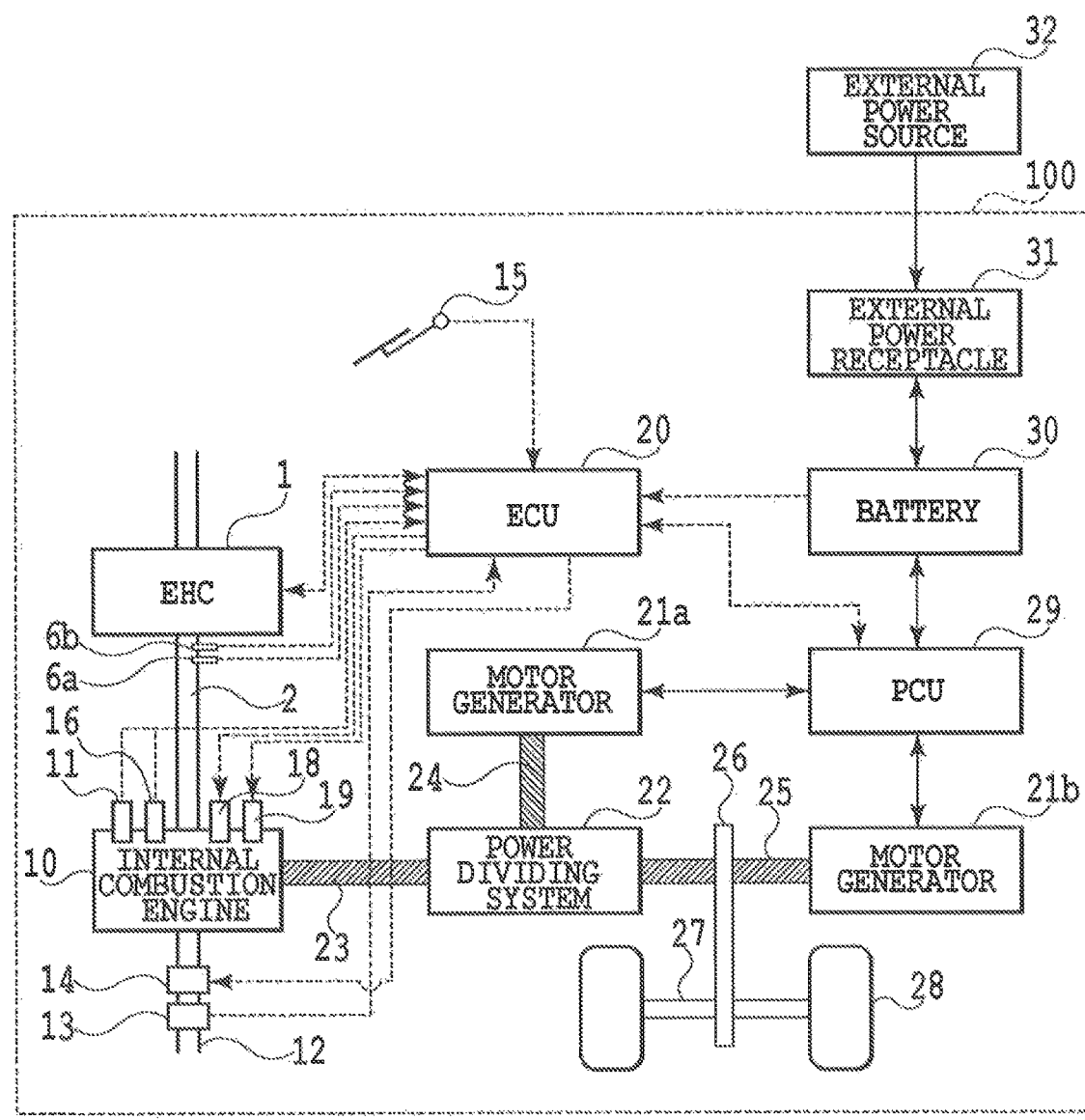
FIG. 1 is a schematic diagram illustrating the configuration of a control device for an internal combustion engine according to an embodiment of the present invention.

FIG. 1 illustrates an internal combustion engine (i.e., an engine), a control device therefor, and a vehicle, on which the engine and the control device are mounted, according to an embodiment of the present invention. An engine 10 is configured as a spark-ignition internal combustion engine (i.e., a gasoline engine) including multiple cylinders (e.g., in-line four cylinders). A vehicle 100 is configured as a hybrid vehicle provided with two vehicle prime movers, that is, the engine 10 and a motor generator. The vehicle 100 is provided with an electronic control unit (hereinafter abbreviated as an "ECU") 20 serving as a control unit configured to control the vehicle 100 and the engine 10.

Here, the type of the engine, the number of cylinders, a cylinder arrangement type (in-line, V type, horizontal opposition, or the like), an ignition type, usage, and the like are not particularly limited. For example, an engine may be a compression ignition type internal combustion engine (a diesel engine). Moreover, the engine may not be used in a vehicle or may not be mounted on a vehicle. In the same manner, the type, usage, and the like of a vehicle are not particularly limited. For example, a vehicle may be a general vehicle using an engine as a single prime mover.

In the present embodiment, there are provided two motor generators, that is, a first motor generator (hereinafter referred to as a "first motor") 21a and a second motor generator (hereinafter referred to as a "second motor") 21b. The first motor 21a is used for mainly starting the engine and charging a storage battery: in contrast, the second motor 21b is used for mainly applying driving force to a vehicle. Here, the first motor 21a may be equipped with the function of applying driving force to a vehicle: in contrast, the second motor 21b may be equipped with the functions of starting the engine and charging the storage battery.

First, explanation will be made on a hybrid system including the engine 10, the first motor 21a, and the second motor 21b. A crankshaft of the engine 10 is coupled to an output shaft 23, and furthermore, the output shaft 23 is coupled to a power dividing system 22. The power dividing system 22 is coupled to the first motor 21a via a power transmission axle 24, and furthermore, is coupled to the second motor 21b via a power transmission axle 25. Here, the power dividing system 22 is adapted to switch the transmission of outputs or the like from the engine 10, the first motor 21a, and the second motor 21b via a planetary gear train. Moreover, a reduction gear 26 is coupled to the power transmission axle 25 coupled to the second motor 21b. Driving wheels 28 are coupled to the reduction gear 26 via a drive shaft 27. The reduction gear 26 is configured by combining a plurality of gears, and is designed to decelerate the rotational speed of the power transmission axle 25 so as to transmit the outputs from the engine 10, the first motor 21a, and the second motor 21b to the drive shaft 27.

The first motor 21a and the second motor 21b are electrically coupled to a power control unit (PCU) 29 including an inverter, not shown. Moreover, the PCU 29 is electrically coupled to a storage battery 30. The PCU 29 is configured to convert DC power taken from the battery 30 into AC power so as to supply the power to the first motor 21a and the second motor 21b, and furthermore, to convert the AC power generated by the first motor 21a and the second motor 21b into the DC power so as to supply it to the battery 30. Specifically, the first motor 21a and the second motor 21b are comprised of an AC synchronous rotating machine. When an excitation current is applied to the first motor 21a and the second motor 21b, torque is generated, and furthermore, when torque is applied from the outside (e.g., when kinetic energy is output from the engine 10 via the power dividing system 22), the kinetic energy is converted into electric energy, and thus, power is generated. The generated power is supplied to the battery 30 via the PCU 29. Moreover, the second motor 21b can function as a generator during the deceleration of the vehicle. The second motor 21b can perform so-called regeneration, by which kinetic energy transmitted from the driving wheels 28 to the power transmission axle 25 via the drive shaft 27 and the reduction gear 26 is converted into electric energy. Electric power generated by the regeneration is supplied to the battery 30 via the PCU 29 as well. In addition, the hybrid vehicle 100 illustrated in FIG. 1 is a plug-in hybrid vehicle that is provided with an external power receptacle 31 capable of receiving power from an external power source 32.

The engine 10 includes a fuel injection valve 18 for injecting fuel and an ignition plug 19 at each of the cylinders. An air flow meter 13 is positioned to an intake passage 12 of the engine 10 for detecting an intake air flow per unit time (i.e., an intake flow rate). An electronically controlled throttle valve 14 is provided downstream of the air flow meter 13, for adjusting the intake air flow. Moreover, a catalyst, particularly an electric heating catalyst (EHC) 1 is provided to an exhaust passage 2 of the engine 10 for purifying exhaust. The EHC 1 comprises a catalyst support for generating heat upon energization or supply of electric power. Its specific configuration will be described in detail later.

The ECU 20 is configured to control the above-described PCU 29, fuel injection valve 18, ignition plug 19, throttle valve 14, and EHC 1. Moreover, a crank angle sensor 11 for detecting the crank angle of the engine 10, an accelerator opening sensor 15 for detecting an opening of an accelerator, and a water temperature sensor 36 for detecting the temperature of cooling water for the engine 10 are electrically coupled to the ECU 20 in addition to the air flow meter 13 and the throttle valve 14. The ECU 20 also monitors a state of charge of the battery 30 via the PCU 29 or the like. To the ECU 20 are electrically coupled an exhaust temperature sensor 6a and an air-fuel ratio sensor 6b that are positioned upstream of the EHC 1 in the exhaust passage 2.

Figure 2:
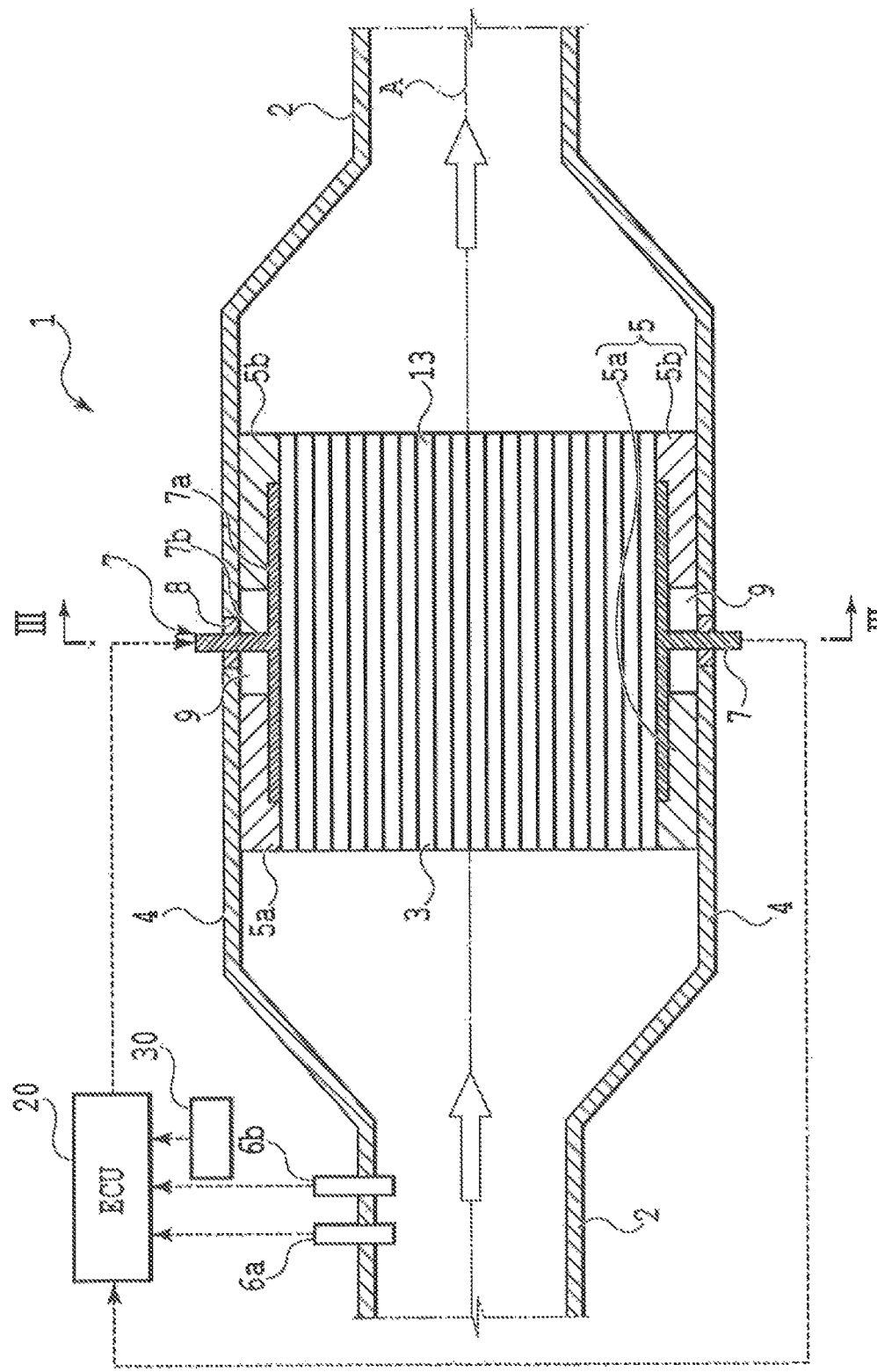
FIG. 2 is a side cross-sectional view showing an electric heating catalyst.
Figure 3:
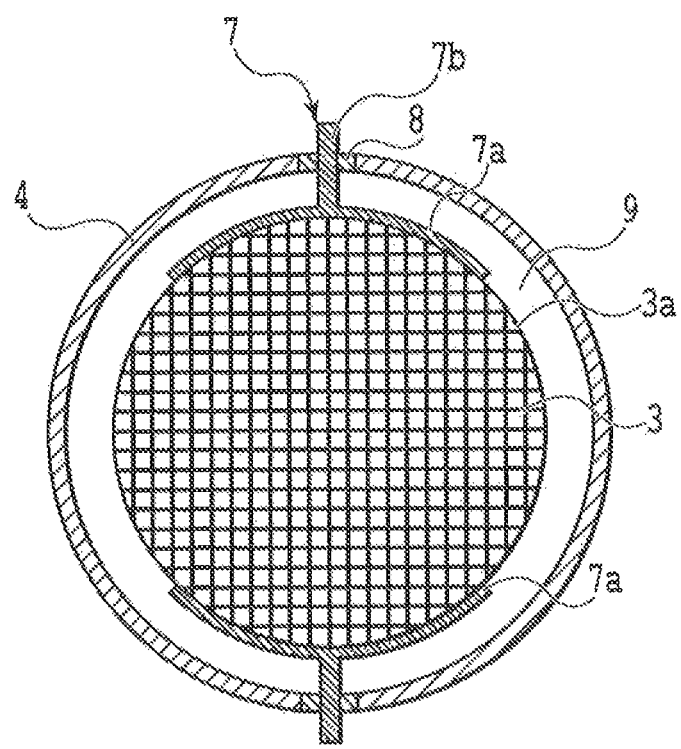
FIG. 3 is a cross-sectional view taken along a line III-III of FIG. 2.

Next, the configuration of the EHC 1 will be explained with reference to FIG. 2 and FIG. 3. FIG. 2 is a cross-sectional view showing the EHC 1 cut away along the center line A of the exhaust passage 2. An outline arrow in FIG. 2 indicates the direction of a flow of exhaust on the exhaust passage 2. Moreover, FIG. 3 is a cross-sectional view showing the EHC 1 cut away in a direction perpendicular to the center line A, and is a cross-sectional view taken along a line II-III of FIG. 2. The EHC 1 is provided with a base or support (hereinafter referred to as a "catalyst support") 3, a case 4, a mat 5, and a pair of electrodes 7. The catalyst support 3 is housed in the case 4. The catalyst support 3 is formed into a columnar shape, and is installed such that its center line is coaxial with the center line A of the exhaust passage 2. The center line A is common to the exhaust passage 2, the catalyst support 3, and the case 4. Here, these members may be installed or arranged non-coaxially with each other. The catalyst support 3 carries thereon a catalytic component 13 that fulfills the function of a three-way catalyst. Here, the catalytic component 13 is not limited to one that fulfills the function of a three-way catalyst, but it may fulfill the function of any one of an oxidation catalyst, a storage reduction type NOx catalyst, and a selective reduction type NOx catalyst. A catalytic component suitable for an exhaust component to be purified (such as CO, HC, or NOx) may be appropriately selected.

The catalyst support 3 includes a conductive heat generator that generates heat upon energization or supply of electric power. In other words, the catalyst support 3 is made of a material that has an electric resistance when energized so as to generate heat. The material of the catalyst support 3 may be exemplified by SiC. The catalyst support 3 includes a plurality of passages that extend in a direction in which exhaust flows (i.e., along the center line A) and has a honeycomb-like cross section perpendicular to the direction in which the exhaust flows. The exhaust flows through the passages. In the present embodiment, the catalyst support 3 is formed into a columnar shape, has a predetermined length along the center line A (that also is the center line of the catalyst support 3) and a predetermined and constant radius on the center line A, and has a circular cross-sectional shape in the direction perpendicular to the center line A. However, the cross-sectional shape is optional, and for example, it may be elliptic or the like.

The pair of electrodes 7 is coupled at the outer peripheral surface 3a of the catalyst support 3. Each of the electrodes 7 includes a surface electrode 7a and a shaft electrode 7b. The surface electrode 7a extends circumferentially and axially along the outer peripheral surface 3a of the catalyst support 3, that is, extends in such a manner as to cover a part of the outer peripheral surface 3a of the catalyst support 3. Moreover, the two surface electrodes 7a are arranged at positions opposite to each other in the diametrical direction of the catalyst support 3 in such a manner as to hold the catalyst support 3 therebetween. One end of the shaft electrode 7b is coupled to the surface electrode 7a. The other end of the shaft electrode 7b projects outward of the case 4 through an electrode chamber 9 formed inside of the case 4. The electrode 7 such configured as described above receives the electric power from the battery 30 so as to energize the catalyst support 3. When the catalyst support 3 generates heat by the energization, the catalytic component 13 carried on the catalyst support 3 is heated, and thus, its activation is promoted. The electric supply to the EHC 1 in the above-described manner is controlled by the ECU 20.

The case 4 is made of metal. The material may be exemplified by stainless steel. The relatively soft mat 5 is held between the inner wall surface of the case 4 and the outer peripheral surface 3a of the catalyst support 3. In other words, the catalyst support 3 is supported by the case 4 via the mat 5. The mat 5 is made of an electric insulating material. The material of the mat 5 may be exemplified by a ceramic fiber including mainly alumina. In this manner, since the mat 5 is held between the catalyst support 3 and the case 4, it is possible to suppress leakage of electricity to the case 4 upon energization of the catalyst support 3. Moreover, the mat 5 in the present embodiment is divided into an upstream portion 5a and a downstream portion 5b that define a space therebetween. This space serves as the electrode chamber 9, into which the shaft electrode 7b of the electrode 7 is inserted. Here, instead of the division of the mat 5 into the upstream portion 5a and the downstream portion 5b, a through hole may be formed only at a portion, into which the electrode 7 is inserted, thus defining a space serving as an electrode chamber.

Additionally, an electrode supporting member 8 for supporting the shaft electrode 7b is disposed in the through hole formed at the case 4, through which the shaft electrode 7b is inserted. The electrode supporting member 8 is made of an electric insulating material, thus electrically insulating the case 4 and the shaft electrode 7b from each other.

As described above, the present inventors made the earnest study, resulting in the new findings that a crack possibly occurs on the catalyst support due to an increase in difference in temperature between predetermined portions of the catalyst support during both of acceleration and deceleration of the engine, particularly, during both of a rapid increase and a rapid decrease in intake air flow. First, these findings will be described below.

Figure 4:
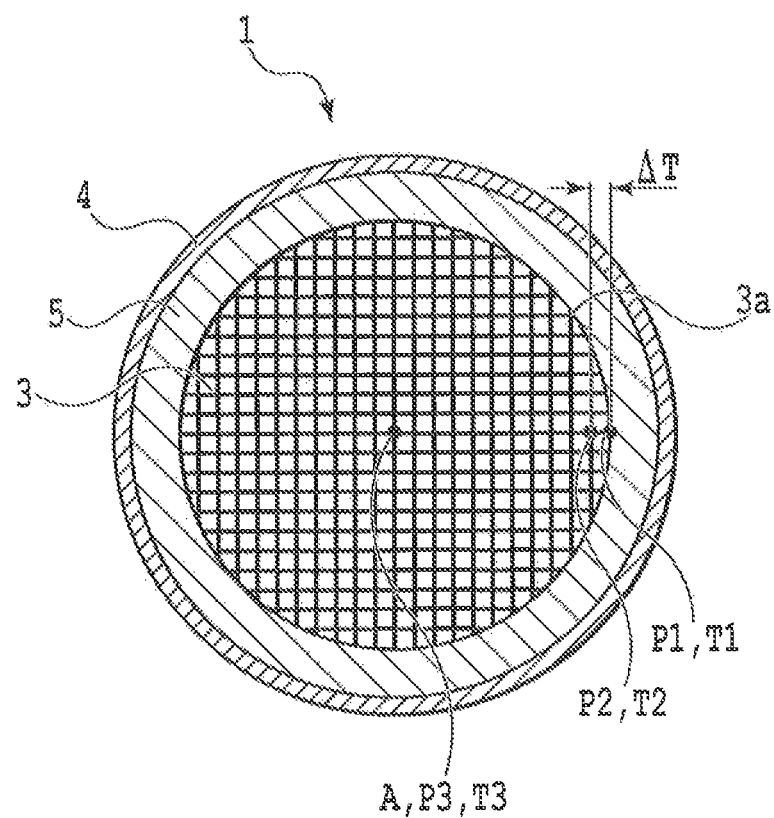
FIG. 4 is a front cross-sectional view showing the electric heating catalyst.

FIG. 4 is a cross-sectional view showing the EHC 1 in the direction perpendicular to the center line A (here, an axial position different from that in FIG. 3). A first portion P1 positioned on the outer peripheral surface 3a of the catalyst support 3 and a second portion P2 positioned inward of the first portion P1 in the radial direction of the support and in the vicinity of the first portion P1 are determined as predetermined portions (or positions) of the catalyst support 3. An interval between the first portion P1 and the second portion P2 is set to, for example, about 5 mm. There is a difference $\Delta T$ in temperature between the first portion P1 and the second portion P2. A portion on the center line A of the catalyst support 3 is referred to as a center portion or a third portion P3.

In the EHC 1, the outer peripheral surface 3a of the catalyst support 3 is coupled to the case 4 via the mat 5, and is positioned nearest the case 4 at least at the catalyst support 3. Furthermore, the case 4 is exposed to outside air. Therefore, the outside air deprives the case 4 of the heat, and furthermore, the case 4 deprives the outer peripheral surface 3a of the heat of the catalyst support 3. In this manner, there arises a difference $\Delta T$ in temperature between the first portion P1 and the second portion P2. T2>T1 and $\Delta T=T2-T1$, where T1 designates the temperature of the first portion P1 and T2 denotes the temperature of the second portion P2.

Figure 5:
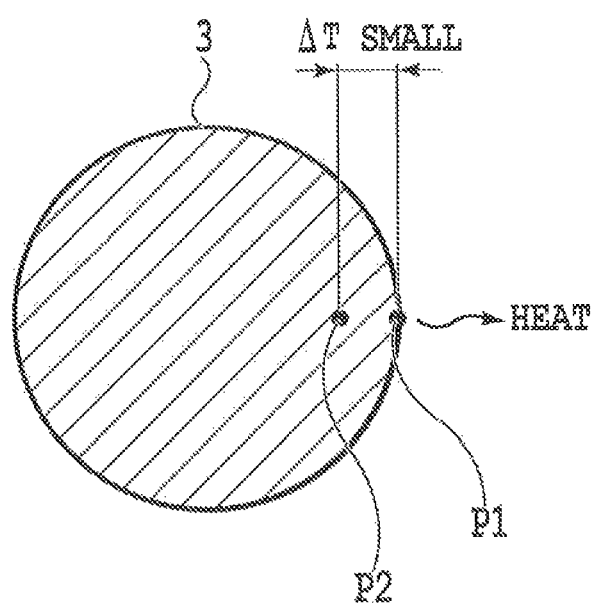
FIG. 5 is a schematic view showing a first portion and a second portion of a catalyst support.

FIG. 5 is a schematic view showing the first portion P1 and the second portion P2 at the catalyst support 3. FIG. 5 shows a state in which the engine normally operates. At this time, the catalyst support 3 has a substantially uniform temperature at its cross section. Therefore, the difference $\Delta T$ in temperature is relatively small.

Figure 6:
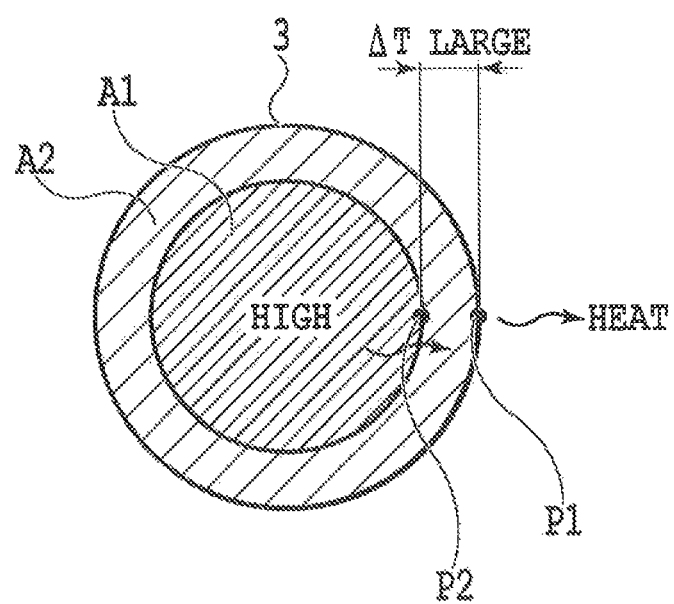
FIG. 6 is another schematic view showing the first portion and the second portion of the catalyst support.

However, when the engine is accelerated from this state, and in particular, an intake air flow is rapidly increased, energy to be supplied from the exhaust to the catalyst support 3, specifically, a heat amount, is increased. As a consequence, the heat amount to be supplied from the exhaust to the catalyst support 3 largely exceeds the heat amount diffused from the outer peripheral surface 3a of the catalyst support 3. And then, as shown in FIG. 6, such a phenomenon happens that the temperature of the catalyst support 3 is gradually increased outward in the radial direction from the center of the catalyst support 3. This phenomenon is more conspicuous as the acceleration is more rapid. Therefore, the temperature T2 of the second portion P2 is relatively largely increased in comparison with the temperature T1 of the first portion P1, thus increasing the difference $\Delta T$ in temperature, as shown. A thermal stress on the catalyst support 3 is increased caused by the increase in difference $\Delta T$ in temperature. The thermal stress exceeds the strength of the support, thereby inducing a concern of occurrence of a crack on the catalyst support 3. An upper limit $\Delta Tlim$ of an allowable difference in temperature is, for example, 120° C., at which the occurrence of a crack on the catalyst support 3 can be prevented. When the difference $\Delta T$ in temperature exceeds the upper limit $\Delta Tlim$, a crack possibly occurs on the catalyst support 3.

In particular, the catalyst support 3 in the EHC 1, like the present embodiment, is weak in support strength with a tendency of easy occurrence of a crack in comparison with a general catalyst support that is not of an electric heating type. Moreover, if a crack occurs on the catalyst support 3 in the EHC 1, an electric resistance on a cracked portion becomes larger than those at other portions. When the EHC 1 is energized, the distribution of an energization amount at the catalyst support 3 does not become uniform, thereby inducing a large difference in temperature at the catalyst support 3, and furthermore, raising a concern about further enlarging or increasing a crack. In view of the above, the occurrence of even a fine crack must be avoided.

Figure 7:
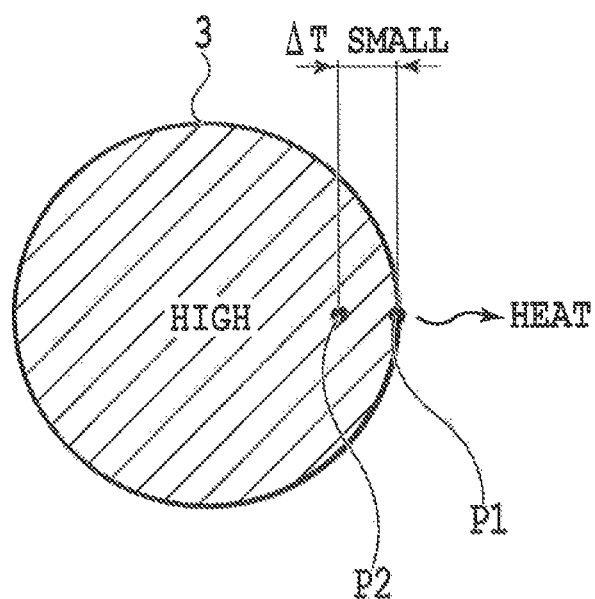
FIG. 7 is a further schematic view showing the first portion and the second portion of the catalyst support.
Figure 8:
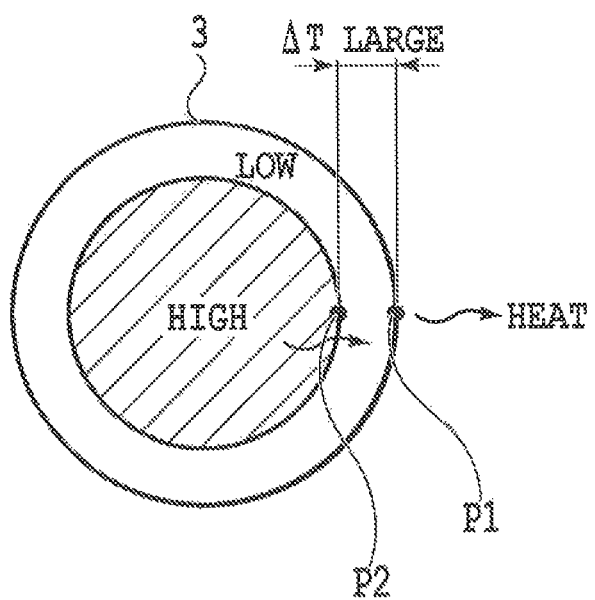
FIG. 8 is a still further schematic view showing the first portion and the second portion of the catalyst support.

In the meantime, FIG. 7 shows a state similar to that shown in FIG. 5. In this state, the engine is decelerated in turn. In particular, when the intake air flow is rapidly decreased, the energy to be supplied from the exhaust to the catalyst support 3, specifically, a heat amount is decreased, or it is substantially stopped. Consequently, the heat amount to be supplied from the exhaust to the catalyst support 3 largely lowers the heat amount diffused from the outer peripheral surface 3a of the catalyst support 3. And then, as shown in FIG. 8, such a phenomenon happens that the temperature of the catalyst support 3 is gradually decreased inward in the radial direction from the outer peripheral surface 3a of the catalyst support 3. This phenomenon is more conspicuous as the deceleration is more rapid. Therefore, the temperature T1 of the first portion P1 is relatively largely decreased in comparison with the temperature T2 of the second portion P2, so that the difference $\Delta T$ in temperature becomes large, as shown. A crack possibly occurs on the catalyst support 3 caused by an increase in difference $\Delta T$ in temperature as well.

In view of the above, in the present embodiment, in the case where the rapid change in intake air flow is detected (i.e., determined) based on the intake air flow of the engine or its correlation value, the ECU 20 controls the energization to the catalyst support 3. The energization to the catalyst support 3 is new measures found by the present inventors as a result of the earnest study, for suppressing an increase in difference in temperature and the occurrence of a crack.

This energization can suppress an increase in difference $\Delta T$ in temperature or can reduce the difference $\Delta T$ in temperature. This is because first, the energization enables the catalyst support 3 (here, assuming a cross section perpendicular to the center line A) to be uniformly heated. In the meantime, since there is a flow of the exhaust in the catalyst support 3, the flow rate of the exhaust tends to be higher at the center in the radial direction of the catalyst support 3 than that at the outer periphery in the radial direction. Therefore, the amount of heat carried away by the exhaust at the center in the radial direction of the catalyst support 3 tends to be more than that at the outer periphery in the radial direction. When the catalyst support 3 is uniformly heated by the energization, the temperature at the outer periphery in the radial direction tends to be increased more than that at the center in the radial direction. In comparison between the respective temperatures T1 and T2 of the first portion P1 and the second portion P2, the temperature T1 of the first portion P1 tends to be increased more than the temperature T2 of the second portion P2. Thus, it is possible to suppress an increase in difference $\Delta T$ in temperature or reduce the difference $\Delta T$ in temperature.

Figure 9:
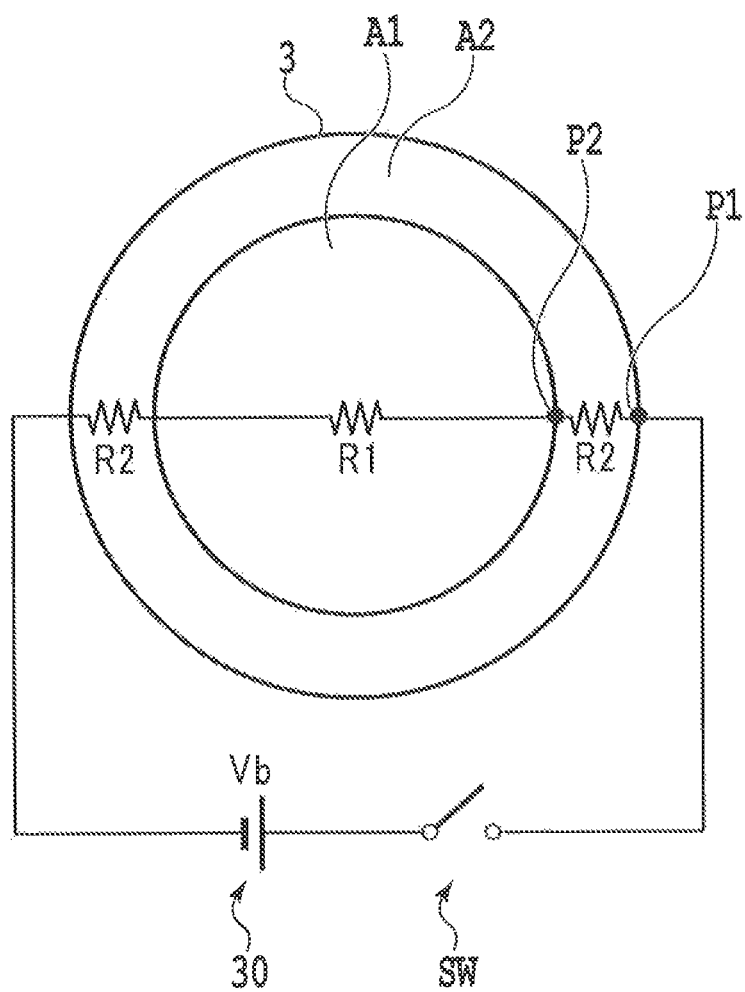
FIG. 9 is a schematic view showing an electric circuit equivalent to the catalyst support.

Another reason why the increase in difference $\Delta T$ in temperature can be suppressed or reduced is conceived, as follows: as shown in FIG. 9, an electric circuit equivalent to the catalyst support 3 is assumed. For the sake of convenience, in the catalyst support 3, a region at the center in the radial direction with respect to the second portion P2 is referred to as a central region A1; and a region on the outer periphery in the radial direction with respect to the second portion P2 is referred to as a peripheral region A2. Moreover, electric resistances of the catalyst support 3 at the central region A1 and the peripheral region A2 are designated by R1 and R2, respectively. In this circuit, the resistances R2, R1, and R2 are connected in series. When a switch SW (corresponding to the ECU 20) is turned on (i.e., the catalyst support 3 is energized), a voltage Vb of the battery 30 is applied to these resistances.

As shown in, for example, FIG. 6, in the state in which a temperature at the central region A1 is relatively high whereas a temperature at the peripheral region A2 is relatively low, the resistances R1 and R2 take values R1a and R2a, respectively, before the energization. In the case where the catalyst support 3 has characteristics that it has a higher electric resistance as the temperature is lower, the resistance value R1a at the central region A1 becomes lower, although the resistance value R2a of the peripheral region A2 is hardly changed, in comparison with the state of the uniform temperature shown in FIG. 5.

And then, the balance between the respective resistance values of the central region A1 and the peripheral region A2 is largely changed so that the resistance value of the peripheral region A2 becomes larger than that of the central region A1. As the resistance value is larger, a difference in potential across both ends of the resistance during the energization becomes larger, so that more electric power can be supplied to the resistance. Consequently, during the energization, the peripheral region A2 is heated faster than the central region A1, thus increasing a rising rate of temperature. As a consequence, it is possible to suppress an increase in difference ΔT in temperature or reduce the difference ΔT in temperature. This applies to the cases shown in FIG. 7 and FIG. 8 in the same manner.

In addition, a further reason why the increase in difference ΔT in temperature can be suppressed or the difference ΔT in temperature can be reduced is as follows: here, uniformly heating the catalyst support 3 by pressing a heating member that is sufficiently heated against the cross section of the catalyst support 3 is conceived as an example equivalent to uniform heating by the energization of the catalyst support 3. For example, in the state shown in FIG. 6, in the case where a heating member is pressed (here, the temperature of the heating member is assumed to be higher than that at the central region A1), a difference in temperature between the heating member and the peripheral region A2 is larger than that between the heating member and the central region A1, and therefore, more neat is transmitted to the peripheral region A2 from the heating member. Thus, the peripheral region A2 is heated faster than the central region A1, and consequently, it is possible to suppress the increase in difference ΔT in temperature or reduce the difference ΔT in temperature.

In this manner, the catalyst support 3 is energized in the case where the rapid change in intake air flow is detected (i.e., determined), so that the occurrence of a crack caused by an increase in difference ΔT in temperature can be suppressed.

The contents of the control in the present embodiment will be specifically described below.

Figure 10:
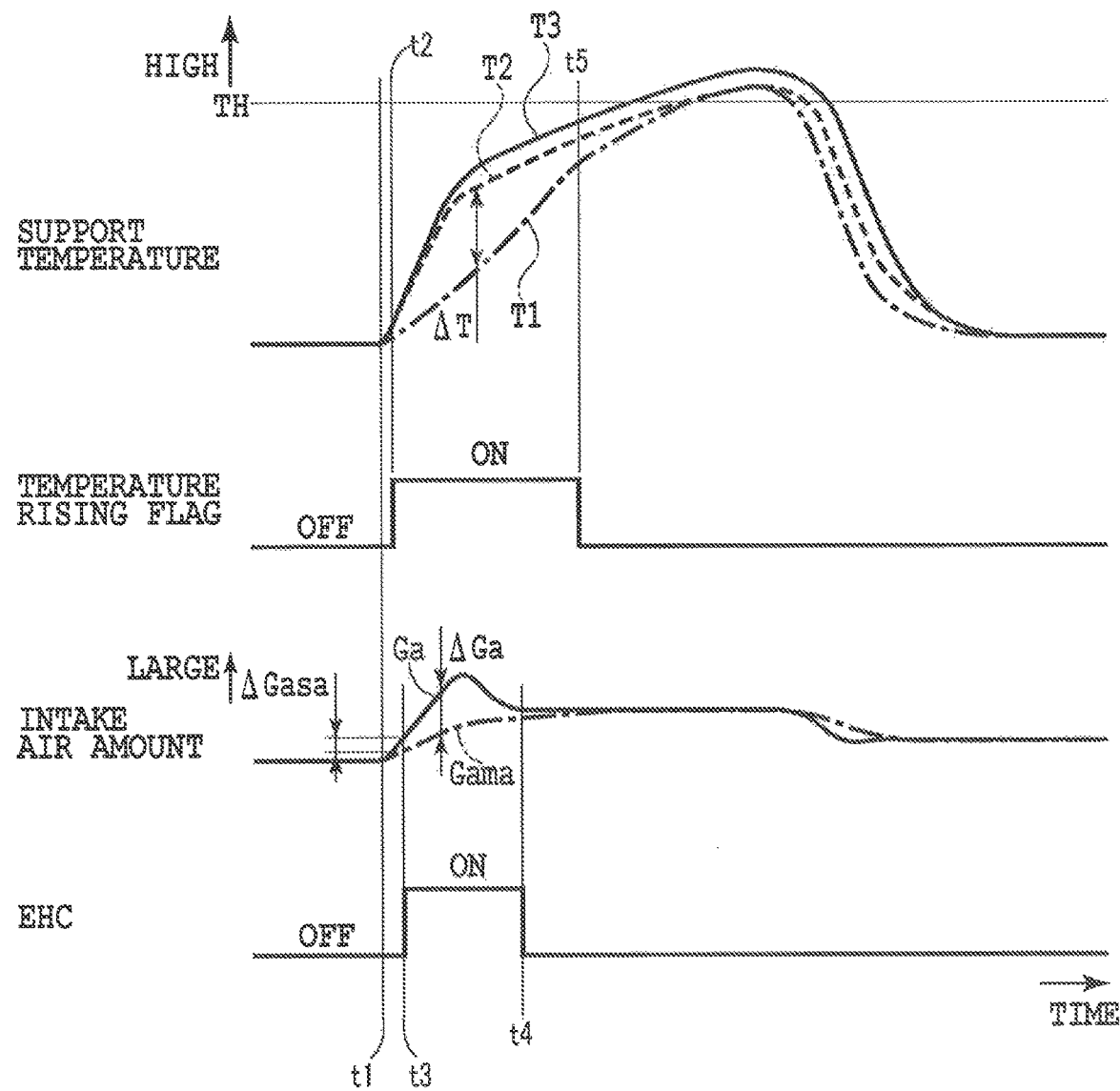
FIG. 10 is a timing chart according to a first example of control in the embodiment.

FIG. 10 is a timing chart illustrating a first example of the control in the embodiment. This first example is relevant to a rapid increase in intake air flow.

A support temperature signifies the temperature of the catalyst support 3, where T1 represents a temperature at the first portion P1; T2, a temperature at the second portion P2; and T3, a temperature at the center portion or the third portion P3 (see FIG. 4). Regarding the intake air flow, Ga represents a detection value detected by the air flow meter 13, and furthermore, Gama represents a processed detection value as a value obtained by averaging the aforementioned detection value.

In the illustrated example, the acceleration of the engine is started at a time t1, and accordingly, the support temperature and the intake air flow are increased. A temperature rising flag is turned on when the rising rate of the support temperature is a predetermined value or higher and the support temperature is a predetermined upper limit temperature TH or lower: otherwise, the flag is turned off. In this case, as the support temperature the temperature T3 at the center portion of the catalyst support 3 is used. This value is estimated by the ECU 20 based on the detection value detected by, for example, the exhaust temperature sensor 6a. However, various support temperature estimating methods including known methods can be utilized. Alternatively, the support temperature may be directly detected by a temperature sensor. The estimation and the detection are referred to as acquisition. In this manner, in the present embodiment, there is provided a support temperature acquiring unit for acquiring the support temperature.

The present example is configured such that only when the temperature rising flag is on, the EHC 1 is turned on, that is, the catalyst support 3 is energized. This is because unnecessary energization is avoided. Specifically, when the rising rate of the support temperature is less than a predetermined value, the difference ΔT in temperature is hardly increased in the first place. Moreover, when the support temperature is higher than the upper limit temperature TH, the support temperature is considerably high, and therefore, even if the amount of heat to be supplied from the exhaust to the catalyst support 3 is increased by the acceleration, the difference ΔT in temperature does not exceed the allowable upper limit ΔTlim or the possibility of an excess is remarkably low. Explanation will be made by way of an understandable example. Even if acceleration occurs under the condition of a high support temperature of 900° C., the possibility that the difference ΔT in temperature exceeds the allowable upper limit ΔTlim is remarkably low. The energization is not needed under such a condition, and therefore, the energization is stopped. In this manner, the control becomes preferable. Here, such a condition is arbitrarily added, and therefore, one example without such a condition may be achieved.

The predetermined value of the rising rate of the support temperature and the upper limit temperature TH of the support temperature are optimally set (adapted) by way of experiments with actual devices or the like, and then, they are previously stored in a memory in the ECU 20. In the shown example, the temperature rising flag is turned on at a time t2 whereas the temperature rising flag is turned off at a time t5. However, the rising rate of the support temperature can be obtained by, for example, calculating the differential value of the support temperature.

Although the intake air flow is detected by the air flow meter 13 and the ECU 20 in the present embodiment, it may be estimated by the ECU 20. In this manner, there is provided an intake air flow acquiring unit for acquiring the intake air flow in the present embodiment.

The processed detection value Gama of the intake air flow is a value (i.e., a so-called smoothed value) obtained by averaging the detection value Ga of the intake air flow (so-called smoothing). In the present embodiment, moving average value calculating is used as averaging, and thus, the processed detection value Gama is regarded as a moving average value of the detection value Ga. However, other averaging may be used. In any rate, the detection value Ga is averaged such that the processed detection value Gama is slowly changed after the detection value Ga.

Specifically, the ECU 20 calculates a processed detection value $Gama_n$ in accordance with a following equation at a current calculation timing (n), based on data on the detection value Ga from the current calculation timing (n) to the calculation timing (N−1) times ago. Reference character N represents the predetermined number of samplings.

$$Gama_n = \{Ga_n + Ga_{n-1} + Ga_{n-2} + \ldots + Ga_{n-(N-1)}\}/N \quad (1)$$

The processed detection value $Gama_n$ is updated per calculation cycle every time, and thus, a latest processed detection value Gama can be calculated based on the data on the samplings of N times from the present to the past at every calculation timing.

As illustrated in FIG. 10, after the start of the acceleration of the engine, the detection value Ga of the intake air flow is largely increased, and accordingly, the processed detection value Gama of the intake air flow is slowly increased with a delay.

In the present example, a rapid increase in intake air flow is detected (i.e., determined) based on a difference between the intake air flow and its averaged value. Specifically, when a difference ΔGa between the detection value Ga and the processed detection value Gama becomes greater than a predetermined differential threshold ΔGasa, a rapid increase in intake air flow is detected (i.e., determined). When the difference ΔGa is greater than the differential threshold ΔGasa, during this period of time, the catalyst support 3 is energized. Here, when the engine is accelerated, the detection value Ga becomes greater than the processed detection value Gama, as illustrated in FIG. 10. As a consequence, for the sake of convenience, the difference ΔGa is defined as being equal to Ga−Gama. However, other defining methods may be used. An absolute value of the difference at the time of the rapid increase in intake air flow is equal to the difference ΔGa. The differential threshold is represented by ΔGasa that takes a positive value. At the time of the rapid increase in intake air flow, the "absolute value of the difference" according to the present invention is represented by ΔGa (=|ΔGa|), and furthermore, the differential threshold according to the present invention is represented by ΔGasa (=|ΔGasa|).

The more rapidly the engine is accelerated, the greater the difference ΔT in temperature becomes, and furthermore, the greater the difference ΔGa tends to become. As a consequence, when the difference ΔGa is greater than the differential threshold ΔGasa, the difference ΔT in temperature may exceed the allowable upper limit ΔTlim or the acceleration is so rapid that the possibility of an excess occurs, and thus, the energization is performed during the acceleration. In consideration of the allowable upper limit ΔTlim or in order to correspond to it, the differential threshold ΔGasa is optimally set (adapted) by way of experiments or the like with actual vehicles, to be thus previously stored in the memory in the ECU 20. The control according to the present embodiment is effective in rapid acceleration during which the difference ΔT in temperature is liable to become larger.

In the example illustrated in FIG. 10, the difference ΔGa becomes greater than the differential threshold ΔGasa at a time t3, and furthermore, the difference ΔGa becomes the differential threshold ΔGasa or less at a time t4. A period from t3 to t4 is included in a period from t2 to t5 during which the temperature rising flag is ON.

Thus, as illustrated in FIG. 10, the EHC 1 is turned on during the period from t3 to t4, so that the catalyst support 3 is energized. In this manner, it is possible to suppress an increase in difference ΔT in temperature, and furthermore, the occurrence of a crack on the catalyst support 3. In particular, in the case where the intake air flow is rapidly increased, a period during which the detection value Ga is apart from the processed detection value Gama is longer. Therefore, a period during which the energization is performed can also be prolonged, so that the energization can be effectively controlled in accordance with the elongation of the period of the increase in difference ΔT in temperature.

Although the rapid increase in intake air flow is detected (determined) based on the intake air flow in the present example, the rapid increase in intake air flow may be detected (determined) based on its correlation value. Examples of the correlation value include an accelerator opening, a throttle opening, an exhaust flow rate, and the like. However, the accelerator opening can be detected by the accelerator opening sensor 15; the throttle opening can be detected by a throttle opening sensor incorporated in the throttle valve 14; and the exhaust flow rate can be detected by an exhaust flowmeter that is additionally disposed.

The energization can be controlled in the present embodiment even if the engine is in cold status and warm status. This is because not only during the cold status of the engine but also during the warm status, the difference ΔT in temperature may exceed the allowable upper limit ΔTlim during the rapid increase in intake air flow. In particular, unlike Patent Literature 1, the energization can be controlled even during the acceleration not immediately after the cold starting of the engine.

Figure 11:
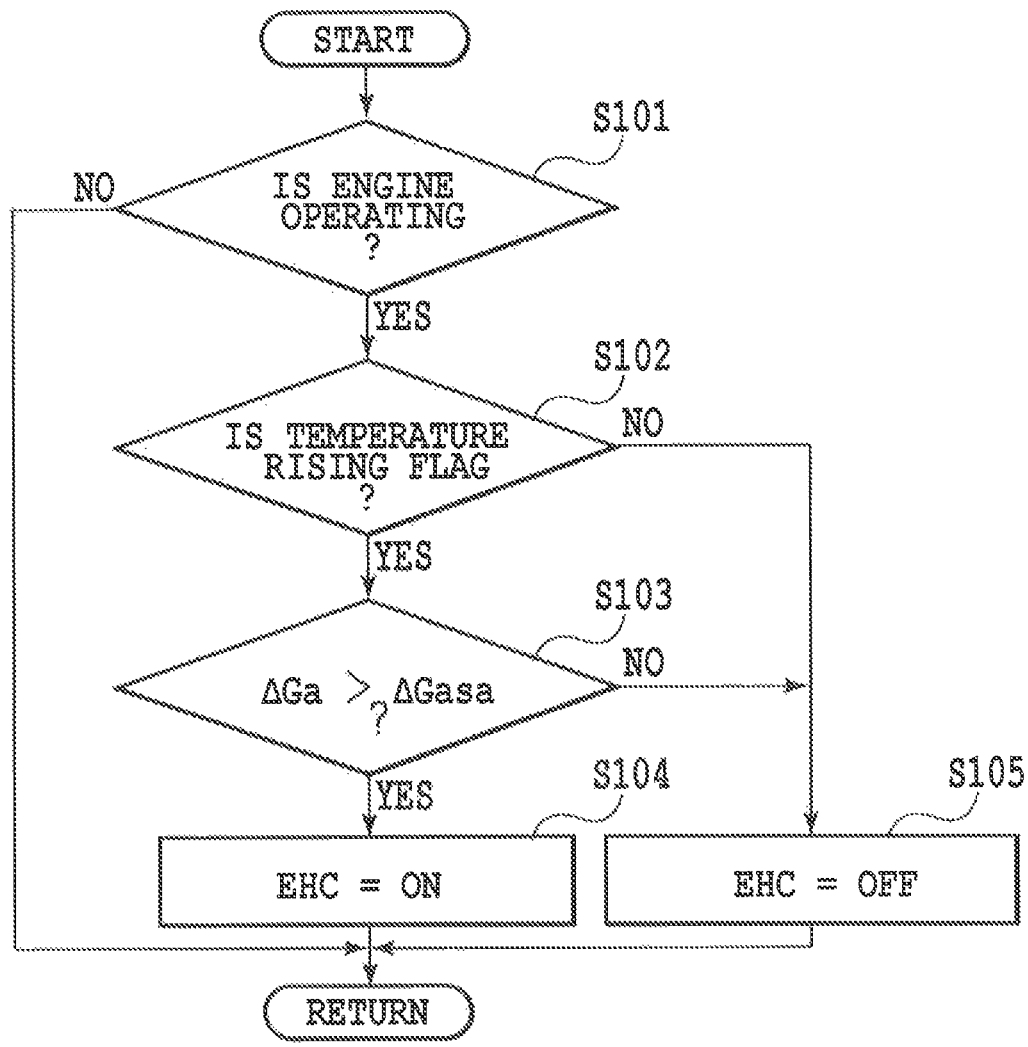
FIG. 11 is a flowchart according to the first example of the control in the embodiment.

Subsequently, a description will be given of a control routine in the present example with reference to FIG. 11. This routine is repeated per predetermined calculation cycle by the ECU 20.

In step S101, it is determined whether or not the engine 10 is operating. If the engine is not operating (i.e., stopped), the routine comes to an end. In contrast, if the engine is operating, the routine proceeds to step S102.

In step S102, it is determined whether or not the temperature rising flag is ON. If the temperature rising flag is ON, the routine proceeds to step S103, in which it is determined whether or not the difference ΔGa is greater than the differential threshold ΔGasa. If the difference ΔGa is greater than the differential threshold ΔGasa, the routine proceeds to step S104, in which the EHC 1 is turned on, that is, the catalyst support 3 is energized.

In contrast, both in the case where the temperature rising flag is not ON (i.e., it is OFF) in step S102 and in the case where the difference ΔGa is equal to or smaller than the differential threshold ΔGasa in step S103, the routine proceeds to step S105, and then, the EHC 1 is turned off, that is, the energization of the catalyst support 3 is stopped.

Figure 12:
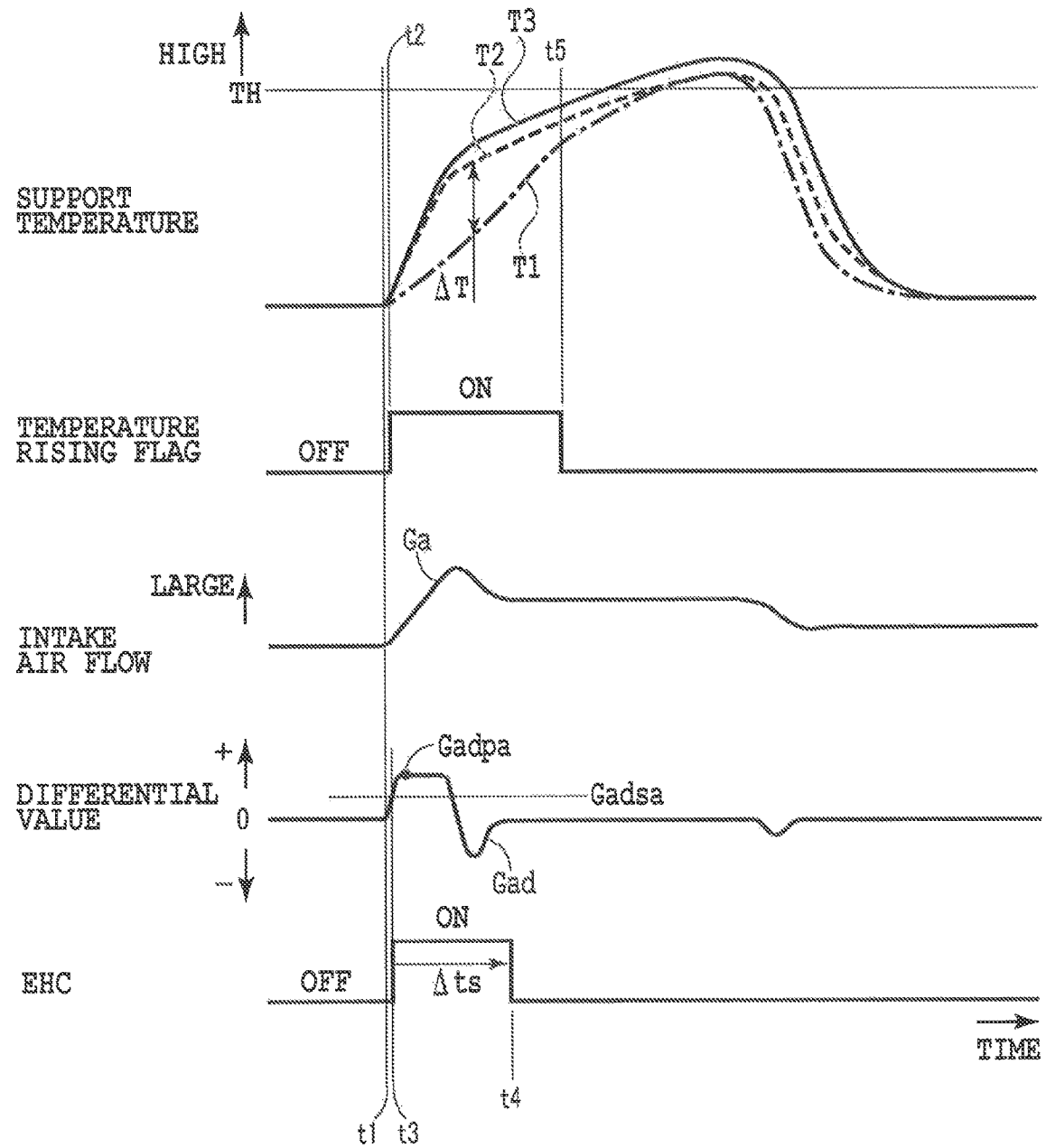
FIG. 12 is a timing chart according to a second example of the control in the embodiment.

Next, a second example of the control in the present embodiment will be explained. FIG. 12 is a timing chart according to a second example. The second example also is relevant to the rapid increase in intake air flow. The support temperature and the temperature rising flag illustrated in FIG. 12 are identical to those illustrated in FIG. 10. The manner of a change in detection value Ga of the intake air flow in FIG. 12 is identical to that illustrated in FIG. 10.

FIG. 12 illustrates a differential value Gad of a detection value Ga of the intake air flow. The differential value Gad is sequentially calculated by the ECU 20 in accordance with the following equation:

$$Gad_n = Ga_n - Ga_{n-1} \quad (2)$$

$Gad_n$ represents a differential value at the current calculation timing (n); $Ga_n$, an intake air flow detection value at the current calculation timing; and $Ga_{n-1}$, an intake air flow detection value at a previous calculation timing (n−1). In particular, the differential value Gad that is positive represents an increasing rate of the intake air flow. The greater the differential value Gad is in a positive direction, the more the increasing rate of the intake air flow becomes.

In the present example, the rapid increase in intake air flow is detected (determined) based on an increasing rate of the intake air flow. In particular, when the absolute value of the increasing rate of the intake air flow exceeds the predetermined rate threshold, the rapid increase in intake air flow is detected (determined). During a predetermined conducting period from the time at which the absolute value of the increasing rate of the intake air flow exceeds the predetermined rate threshold, the catalyst support 3 is energized. Here, when the rapid increase in intake air flow is generated, the differential value Gad becomes greater than a predetermined differential threshold Gadsa having a positive value, as illustrated in FIG. 12. In view of this, in the present example, when the differential value Gad exceeds the differential threshold Gadsa, it is determined that the absolute value of the increasing rate of the intake air flow exceeds the predetermined rate threshold, and then, energization is performed. Here, the increasing rate of the intake air flow and the rate threshold may be represented by other values. During the rapid increase in intake air flow, the "rate of change of the intake air flow" according to the present invention corresponds to the increasing rate of the intake air flow; the "absolute value of the rate of change of the intake air flow" according to the present invention, to Gad (=|Gad|); and the "rate threshold" according to the present invention, to Gadsa (=|Gadsa|).

Figure 13:
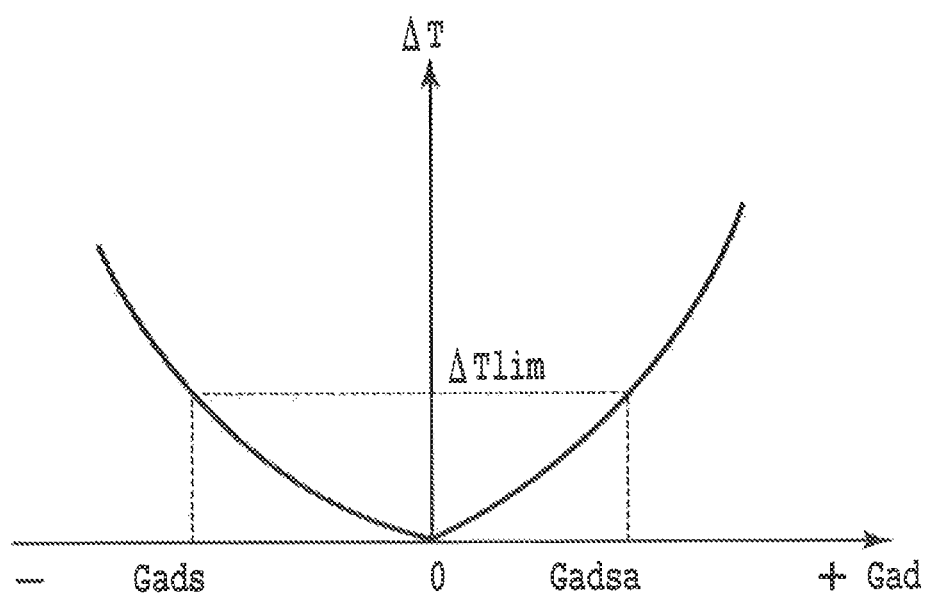
FIG. 13 is a graph illustrating the relationship between a difference in temperature and a differential value.

As the engine is rapidly accelerated, the difference ΔT in temperature becomes greater, and furthermore, there is a tendency of the appearance of a large positive differential value Gad. FIG. 13 schematically illustrates the relationship between the difference ΔT in temperature and the differential value Gad. Assuming that there is a possibility that the difference ΔT in temperature exceeds the allowable upper limit ΔTlim when the differential value Gad exceeds the differential threshold Gadsa or an increase in intake air flow is so rapid that the possibility of an excess occurs, the energization is performed during a conducting period Δts. In consideration of the allowable upper limit ΔTlim of the difference ΔT in temperature or in order to correspond thereto, the differential threshold Gadsa is optimally set (adapted) by experiments or the like with actual devices, and then, is previously stored in the memory in the ECU 20 (see FIG. 13). In the same manner, the conducting period Δts of the energization is optimally set (adapted) by experiments or the like with actual devices in consideration of the allowable upper limit ΔTlim of the difference ΔT in temperature, and then, is previously stored in the memory in the ECU 20.

In the example illustrated in FIG. 1 the differential value Gad exceeds the differential threshold Gadsa at the time t3. The EHC 1 is turned on after the time t3 until the time t4 when the predetermined conducting period Δts elapses. The period from t3 to t4 is included in the period from t2 to t5, during which the temperature rising flag is turned on. The conduction of the above-described energization control can suppress an increase in difference ΔT in temperature and occurrence of a crack on the catalyst support 3.

As described above, although the rapid increase in intake air flow is detected (determined) based on the intake air flow in the present example, the rapid increase in intake air flow may be detected (determined) based on its correlation value.

Figure 14:
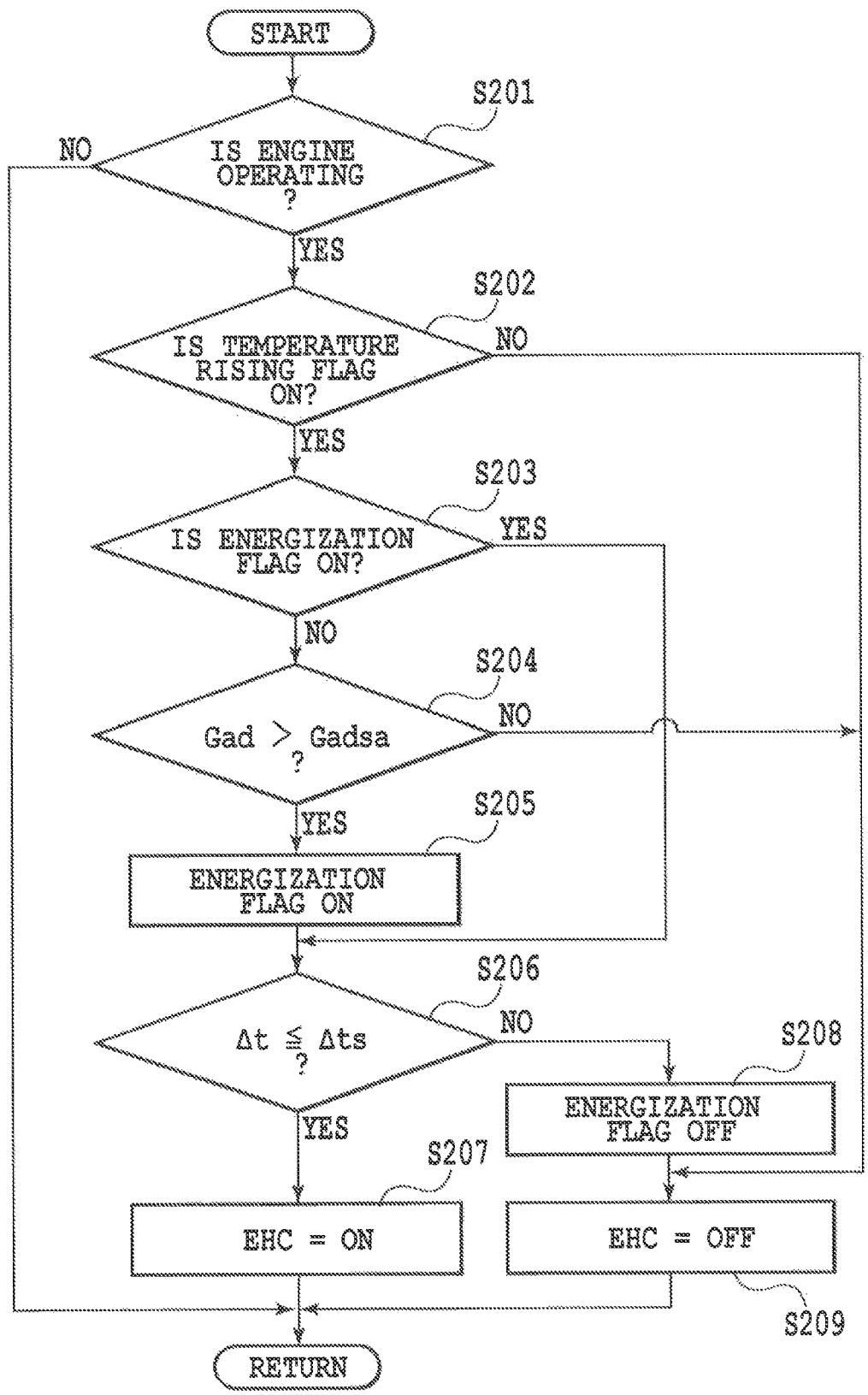
FIG. 14 is another flowchart according to the second example of the control in the embodiment.

Referring to FIG. 14, a control routine in the present example will be explained below. The processing in steps S201 and S202 is identical to that in steps S101 and S102 in the first example (FIG. 11). In the case where the temperature rising flag is ON in step S202, the control routine proceeds to step S203, in which it is determined whether or not the energization flag is ON. The initial status of the energization flag is OFF. In the case where the energization flag is not ON, the control routine proceeds to step S204, in which it is determined whether or not the differential value Gad exceeds the differential threshold Gadsa. If the determination is YES, the control routine proceeds to step S205, in which the energization flag is turned on.

Next, in step S206, it is determined whether or not a lapsed time Δt after the differential value Gad first exceeds the differential threshold Gadsa is equal to or less than the predetermined conducting period Δts. If the determination is YES, the control routine proceeds to step S207, and then, the EHC 1 is turned on.

On the other hand, in the case where it is determined in step S203 that the energization flag is ON, the control routine skips steps S204 and S205, and then, proceeds to step S206. In the case where it is determined in step S206 that the lapsed time Δt exceeds the conducting period Δts, the control routine proceeds to step S208, in which the energization flag is turned off, and then, the EHC 1 is turned off in step S209. Also in the case where the determination in step S202 is NO, the control routine proceeds to step S209.

In accordance with this routine, assuming that the determination in step S201 is YES and the determination in step S202 is YES, when the differential value Gad first exceeds the differential threshold Gadsa (Yes in step S204), the energization flag is turned on (step S205). Since the lapsed time Δt does not exceed the conducting period Δts (YES in step S206), the energization is performed (step S207). Thereafter, since the energization flag is ON, the control routine jumps to step S206 from step S203, the energization is performed (step S207) until the lapsed time Δt exceeds the conducting period Δts (YES in step S206). After that, when the lapsed time Δt exceeds the conducting period Δts (NO in step S206), the energization flag is turned off (step S208), and then, the energization is stopped (step S209).

In terms of a modification of the present example, the conducting period Δts for energizing at the time of the rapid increase in intake air flow may be constant or may be variable. In particular, it is preferable that the conducting period Δts should be changed according to the maximum value of the absolute value of the increasing rate of the intake air flow (or its correlation value).

As illustrated in FIG. 12, the positive differential value Gad represents the increasing rate of the detection value Ga of the intake air flow. The positive differential value Gad reaches a maximum value Gadpa after exceeding the differential threshold Gadsa, and thereafter, is decreased. This maximum value Gadpa represents a maximum value of the absolute value of the increasing rate of the intake air flow. The greater the maximum value Gadpa is, the greater the maximum value of the absolute value of the increasing rate of the intake air flow is.

Figure 15:
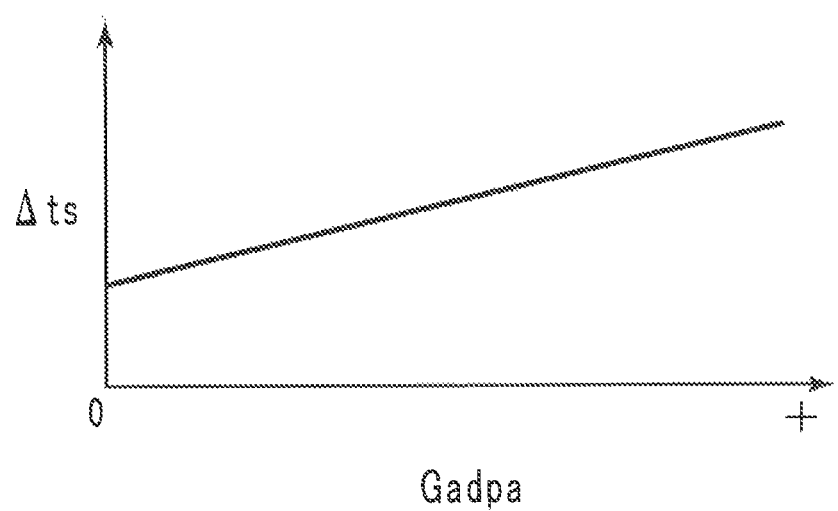
FIG. 15 is a graph illustrating a map according to a modification of the second example.

In this preferred example, the conducting period Δts may be changed according to the maximum value Gadpa. Specifically, in accordance with a predetermined map illustrated in, for example, FIG. 15, as the maximum value Gadpa (having a positive value) becomes greater, that is, the maximum value of the absolute value of the increasing rate of the intake air flow becomes greater, the conducting period Δts is prolonged.

As the maximum value of the absolute value of the increasing rate of the intake air flow is greater, the increase in intake air flow becomes rapider, and furthermore, it is construed that the difference ΔT in temperature becomes greater. Thus, as the maximum value of the absolute value of the increasing rate of the intake air flow is greater, the conducting period Δts is prolonged, thereby effectively suppressing an increase in difference ΔT in temperature.

In the case where the modification is applied to the routine illustrated in FIG. 14, both of the acquisition of the maximum value Gadpa and the calculation and setting of the conducting period Δts corresponding to the acquired maximum value Gadpa are performed at the same time in step S206. Here, the conducting period Δts may be set to a predetermined value before the acquisition of the maximum value Gadpa.

Figure 16:
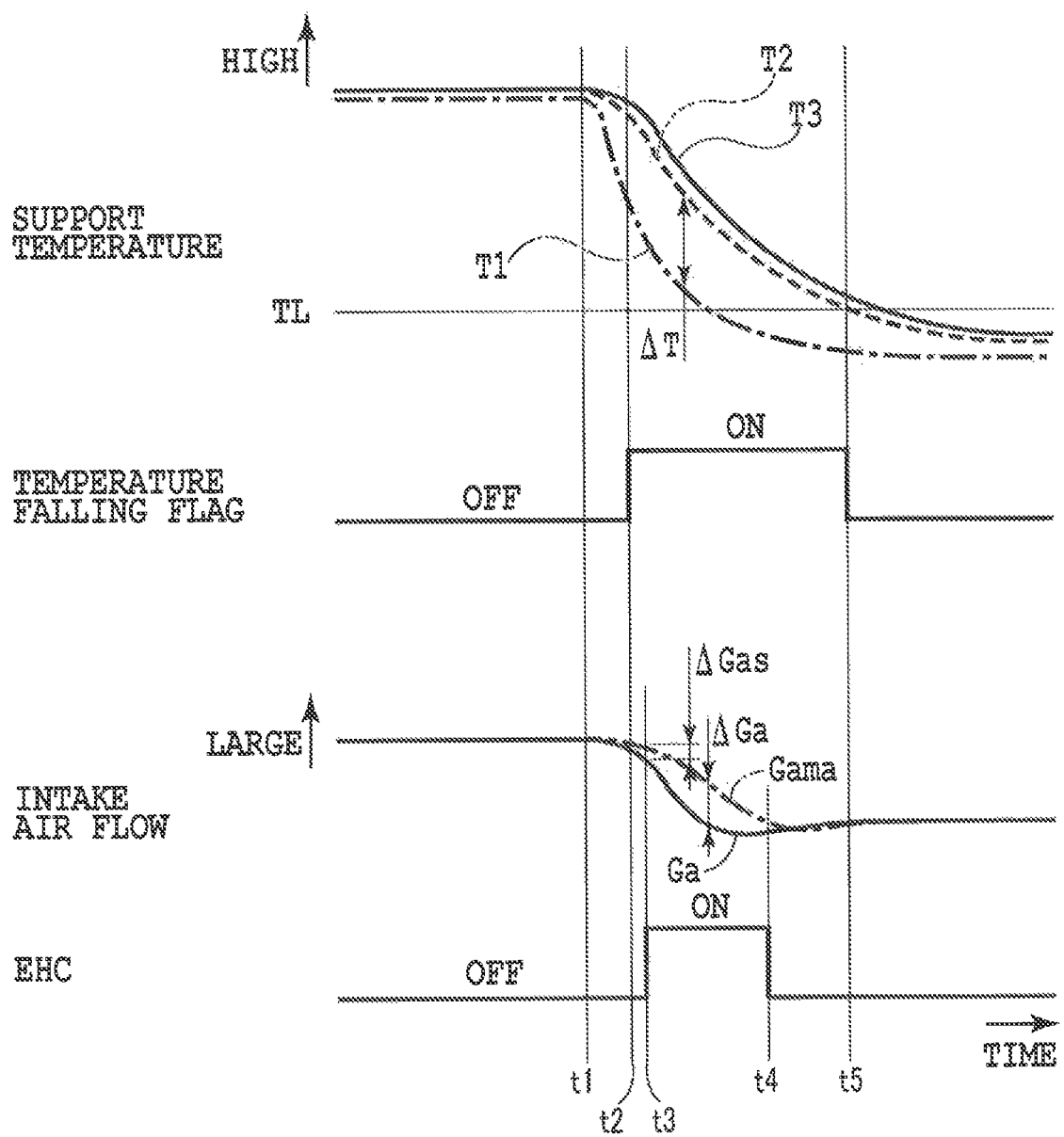
FIG. 16 is a timing chart according to a third example of the control in the embodiment.

Subsequently, a third example of the control in the present embodiment will be described below. FIG. 16 is a timing chart according to the third example. The third example is relevant to a rapid decrease in intake air flow.

The deceleration of the engine is started at a time t1, and accordingly, the support temperature and the intake air flow are decreased. A temperature falling flag is turned on when the falling rate of a support temperature T3 is equal to or higher than a predetermined value and the support temperature is equal to or higher than a predetermined lower limit temperature TL whereas otherwise, it is turned off. Here, the lower limit temperature TL is considerably lower than the upper limit temperature TH.

In the present example, only when the temperature falling flag is ON, energization is performed. In the same manner as described above, this is because unnecessary energization is avoided. Specifically, when the falling rate of the support temperature is less than a predetermined value, a difference ΔT in temperature is hardly increased in the first place. Moreover, when the support temperature is lower than the lower limit temperature TL, the support temperature is inherently low, and therefore, the difference ΔT in temperature does not exceed the allowable upper limit ΔTlim (e.g., 120° C.) or the possibility of an excess is remarkably low. Explanation will be made by way of an understandable example. Even if deceleration occurs under the condition that the outside temperature is 25° C. and a support temperature is 100° C., the difference ΔT in temperature is theoretically increased only up to 75° C. The energization is not needed under such a condition, and therefore, the energization is stopped. In this manner, unnecessary energization can be securely avoided, and therefore, the control can be preferable. Here, such a condition is arbitrarily added, and therefore, one example without this condition may be achieved.

The predetermined value of the falling rate of the support temperature and the lower limit temperature TL of the support temperature are optimally set (adapted) by way of experiments with actual devices or the like, and then, they are previously stored in the memory in the ECU 20. In the shown example, the temperature falling flag is turned on at a time t2 whereas the temperature falling flag is turned off at a time t5. Here, the falling rate of the support temperature can be obtained by, for example, calculating the differential value of the support temperature.

This example uses the processed detection value Gama of the intake air flow, like the first example (FIG. 10). As illustrated in FIG. 16, after the start of the deceleration of the engine, the detection value Ga of the intake air flow is largely decreased, and accordingly, the processed detection value Gama of the intake air flow also is slowly decreased with a delay.

Also in this example, when the absolute value of a difference between a detection value Ga and a processed detection value Gama exceeds a predetermined differential threshold, the catalyst support 3 is energized. Here, as described above, the difference is defined by ΔGa=Ga−Gama. The difference ΔGa has a negative value during deceleration. For the sake of convenience, the difference ΔGa is compared with the differential threshold ΔGas having a negative value. When ΔGa<ΔGas, energization is performed. During deceleration, the "absolute value of the difference" according to the present invention is designated by |ΔGa|, and furthermore, the differential threshold according to the present invention is denoted by |ΔGas|.

The more rapidly the engine is decelerated, the greater the difference ΔT in temperature becomes, and furthermore, the greater the difference ΔGa tends to become in a negative direction. As a consequence, when the difference ΔGa is smaller than the differential threshold ΔGas, the difference ΔT in temperature may exceed the allowable upper limit ΔTlim or the decrease in intake air flow is so rapid that the possibility of an excess occurs, and thus, the energization is performed during the deceleration. In consideration of the allowable upper limit ΔTlim, the differential threshold ΔGas is optimally set (adapted) by way of experiments or the like with actual devices, to be thus previously stored in the memory in the ECU 20. The control according to the present embodiment is effective in rapid deceleration during which the difference ΔT in temperature is liable to become larger.

In the example illustrated in FIG. 16, the difference ΔGa becomes smaller than the differential threshold ΔGas at a time t3, and furthermore, the difference ΔGa becomes the differential threshold ΔGas or more at a time t4. The period from t3 to t4 is included in the period from t2 to t5 at which the temperature falling flag is ON.

Thus, as illustrated in FIG. 16, the EHC 1 is turned on during the period from t3 to t4. In this manner, it is possible to suppress an increase in difference ΔT in temperature, and furthermore, the occurrence of a crack on the catalyst support 3. In particular, in the case where the intake air flow is rapidly decreased, a period during which the detection value Ga is apart from the processed detection value Gama is longer. Therefore, a period during which the energization is performed also is prolonged, so that the energization can be effectively controlled in accordance with the prolongation of the period of the increase in difference ΔT in temperature.

In the same manner as described above, the rapid decrease in intake air flow may be detected (determined) based on not the intake air flow but its correlation value, and furthermore, the energization can be controlled even during cold and warm times of the engine.

Figure 17:
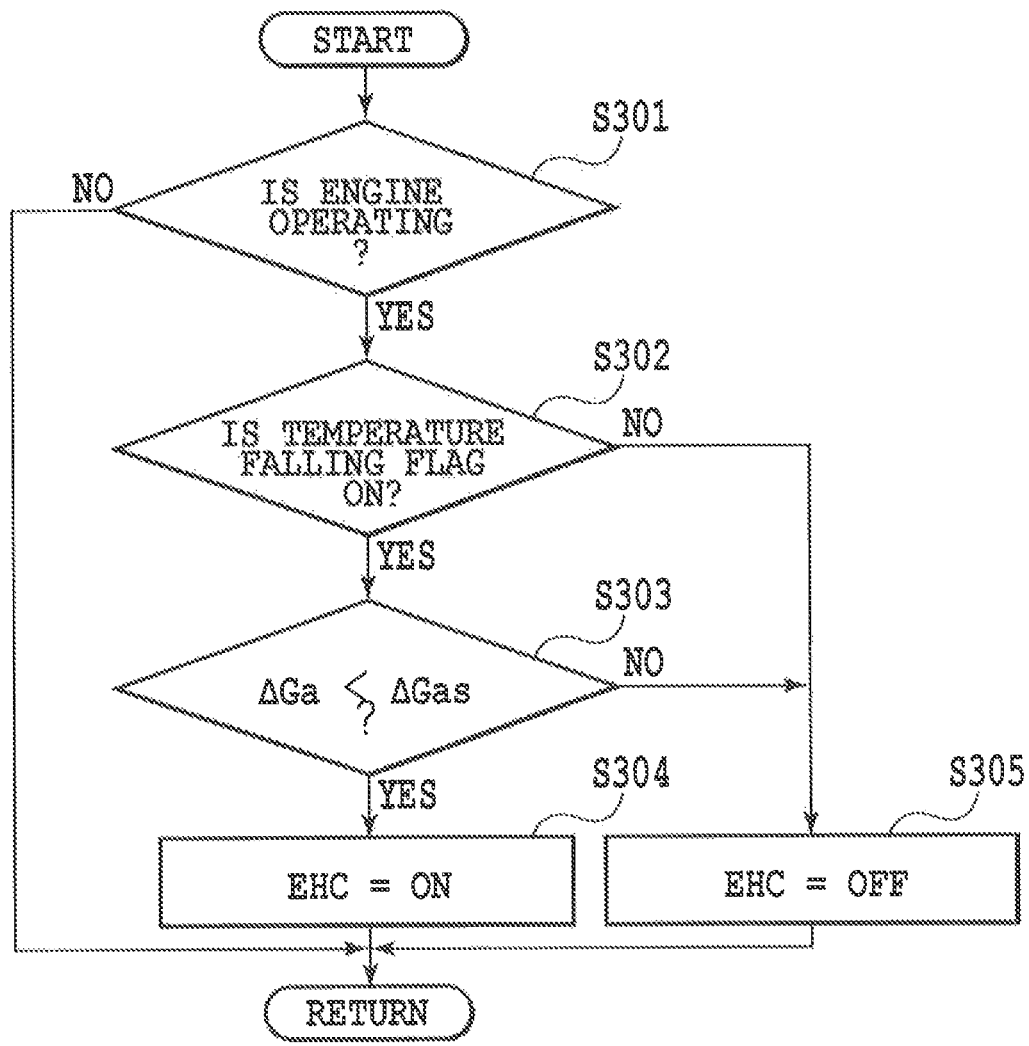
FIG. 17 is another flowchart according to the third example of the control in the embodiment.

A description will be given of a control routine in the present example with reference to FIG. 17. In step S301, it is determined whether or not the engine 10 is operating. If the engine is not operating (i.e., stopped), the routine comes to an end. In contrast, if the engine is operating, the routine proceeds to step S302.

In step S302, it is determined whether or not the temperature falling flag is ON. If the temperature falling flag is ON, the routine proceeds to step S303, in which it is determined whether or not the difference ΔGa is smaller than the differential threshold ΔGas. If the difference ΔGa is smaller than the differential threshold ΔGas, the routine proceeds to step S304, and then, the EHC 1 is turned on (energized).

In contrast, both in the case where the temperature falling flag is not ON in step S302 and in the case where the difference ΔGa is equal to or greater than the differential threshold ΔGas in step S303, the routine proceeds to step S305, and then, the EHC 1 is turned off (deenergized).

Incidentally, the absolute value |ΔGas| of the differential threshold at the time of the deceleration used in the third example may be equal to the absolute value |ΔGasa| of the differential threshold at the time of the acceleration used in the first example, or may be different therefrom.

Figure 18:
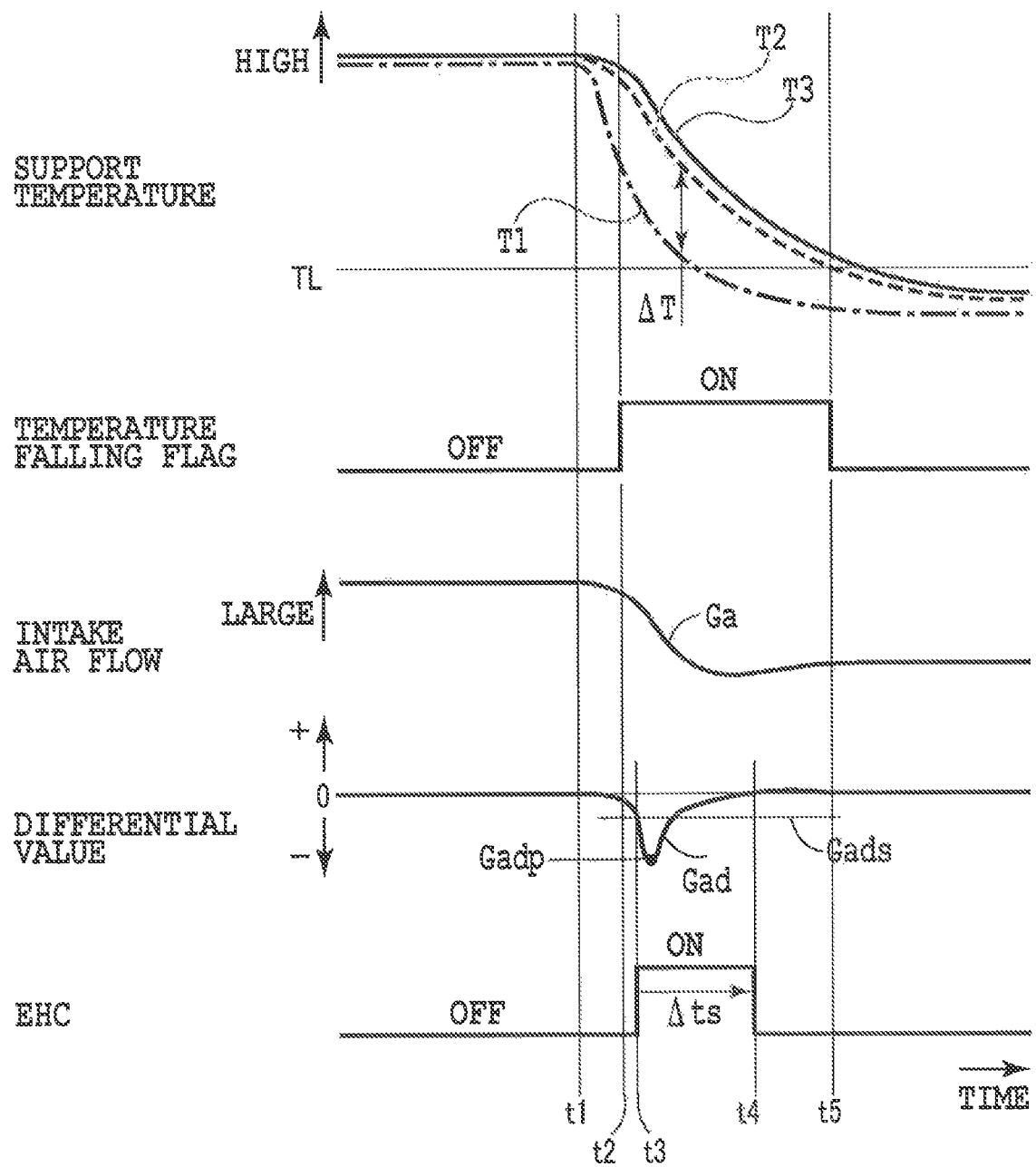
FIG. 18 is a timing chart according to a fourth example of the control in the embodiment.

Next, a fourth example of the control in the present embodiment will be explained. FIG. 18 is a timing chart according to the fourth example. The fourth example is relevant to the deceleration of the engine. The support temperature and the temperature falling flag illustrated in FIG. 18 are identical to those illustrated in FIG. 16. The manner of a change in detection value Ga of the intake air flow is identical to that illustrated in FIG. 16.

FIG. 18 illustrates a differential value Gad of a detection value Ga of the intake air flow. The differential value Gad is calculated by the same method as that in the second example. In particular, the differential value Gad that is negative represents a decrease rate of the intake air flow. The greater the differential value Gad is in a negative direction, the more the decrease rate of the intake air flow becomes.

In the present example, similarly to the second example, a rapid decrease in intake air flow is detected (determined) based on a decrease rate of the intake air flow. In particular, when the absolute value of the decrease rate of the intake air flow exceeds a predetermined rate threshold, the rapid decrease in intake air flow is detected (determined). During a predetermined conducting period Δts after the absolute value of the decrease rate of the intake air flow exceeds the predetermined rate threshold, the energization is performed. Here, when the rapid decrease in intake air flow is generated, the differential value Gad becomes smaller than a predetermined differential threshold Gads having a negative value, as illustrated in FIG. 18. In view of this, in the present example, when the differential value Gad becomes smaller than the differential threshold Gads, it is determined that the absolute value of the decrease rate of the intake air flow exceeds the predetermined rate threshold, and then, the energization is performed. Here, the decrease rate of the intake air flow and the rate threshold may be represented by other values. During the rapid decrease in intake air flow, the "rate of change of the intake air flow" according to the present invention corresponds to the decrease rate of the intake air flow; the "absolute value of the rate of change of the intake air flow" according to the present invention, to |Gad|; and the "rate threshold" according to the present invention, to |Gads|.

As the engine is rapidly decelerated, the difference ΔT in temperature becomes greater, and furthermore, there is a tendency of the appearance of a small negative differential value Gad (see FIG. 18). Assuming that there is a possibility that the difference ΔT in temperature exceeds the allowable upper limit ΔTlim when the differential value Gad becomes smaller than the differential threshold Gads or the decrease in intake air flow is so rapid that the possibility of an excess occurs, the energization is performed during the conducting period Δts. In consideration of the allowable upper limit ΔTlim of the difference ΔT in temperature or in order to correspond to the allowable upper limit ΔTlim, the differential threshold Gads is optimally set (adapted) by experiments or the like with actual devices, and then, is previously stored in the memory in the ECU 20. In the same manner, the conducting period Δts of the energization is optimally set (adapted) by experiments or the like with actual devices in consideration of the allowable upper limit ΔTlim of the difference ΔT in temperature, and then, is previously stored in the memory in the ECU 20.

In the example illustrated in FIG. 18, the differential value Gad becomes smaller than the differential threshold Gads at the time t3. The energization is performed after the time t3 until the time t4 when a predetermined conducting period Δts elapses. The period from t3 to t4 is included in the period from t2 to t5, during which the temperature falling flag is turned on. The conduction of the above-described energization can suppress an increase in difference ΔT in temperature and occurrence of a crack on the catalyst support 3.

As described above, although the rapid decrease in intake air flow is detected (determined) based on the intake air flow in the present example, the rapid decrease in intake air flow may be detected (determined) based on its correlation value.

Figure 19:
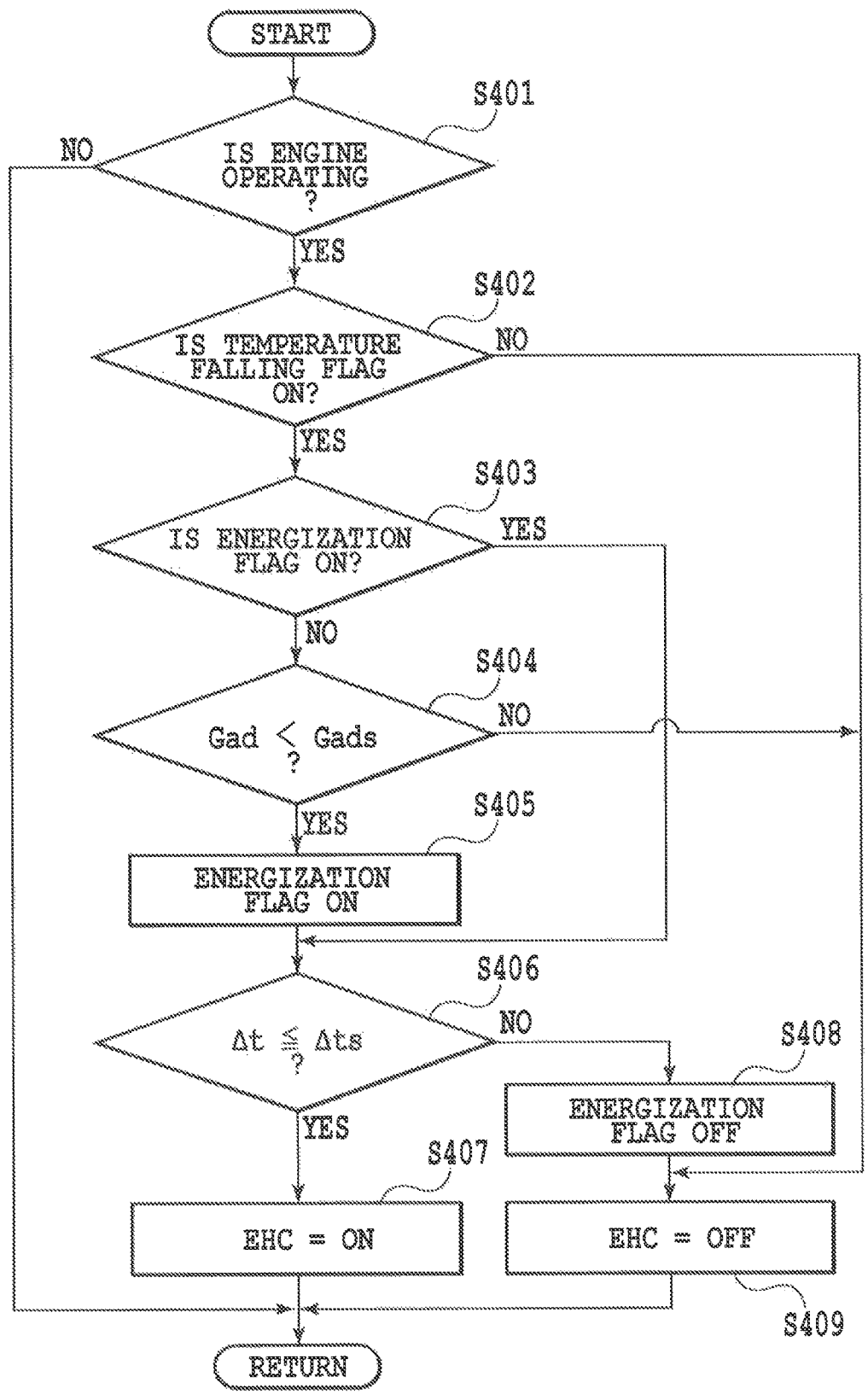
FIG. 19 is another flowchart according to the fourth example of the control in the embodiment.

Referring to FIG. 19, a control routine in the present example will be explained below. The processing in steps S401 and S402 is identical to steps S301 and S302 in the third example (FIG. 17). In the case where the temperature falling flag is ON in step S402, the control routine proceeds to step S403, in which it is determined whether or not the energization flag is ON. In the case where the energization flag is not ON (it is OFF), the control routine proceeds to step S404, in which it is determined whether or not the differential value Gad is smaller than the differential threshold Gads. If the determination is YES, the control routine proceeds to step S405, in which the energization flag is turned on.

Next, in step S406, it is determined whether or not a lapsed time Δt after the differential value Gad first becomes smaller than the differential threshold Gads is equal to or less than the predetermined conducting period Δts. If the determination is YES, the control routine proceeds to step S407, and then, the EHC 1 is turned on so that the energization is performed.

On the other hand, in the case where it is determined in step S403 that the energization flag is ON, the control routine skips steps S404 and S405, and then, proceeds to step S406. In the case where it is determined in step S406 that the lapsed time Δt exceeds the conducting period Δts, the control routine proceeds to step S408, in which the energization flag is turned off, and then, the EHC 1 is turned off in step S409 so that the energization is stopped. Also in the case where the determination in step S402 is NO, the control routine proceeds to step S409.

In accordance with this routine, assuming that the determinations in steps S401 and 3402 are YES, when the differential value Gad first becomes smaller than the differential threshold Gads (Yes in step S404), the energization flag is turned on (step S405). Since the lapsed time Δt does not exceed the conducting period Δts (YES in step S406), the energization is performed (step S407). Thereafter, since the energization flag is ON, the control routine jumps to step S406 from step S403. Until the lapsed time Δt exceeds the conducting period Δts (YES in step S406), the energization is performed (step S407). After that, when the lapsed time Δt exceeds the conducting period Δts (NO in step S406), the energization flag is turned off (step S408), and then, the energization is stopped (step S409).

Incidentally, the absolute value |Gads| of the differential threshold at the time of the deceleration used in the fourth example may be equal to the absolute value |Gadsa| of the differential threshold at the time of the acceleration used in the second example, or may be different therefrom. In the same manner, the conducting period Δts at the time of the deceleration used in the fourth example may be equal to the conducting period Δts at the time of the acceleration used in the second example, or may be different therefrom.

In terms of a modification of the present example, the conducting period Δts for energizing at the time of the rapid decrease in intake air flow may be constant, or may be variable. In particular, it is preferable that the conducting period Δts should be changed according to the maximum value of the absolute value of the decrease rate of the intake air flow (or its correlation value).

As illustrated in FIG. 18, the negative differential value Gad represents the decrease rate of the detection value Ga of the intake air flow. The negative differential value Gad reaches a minimum value Gadp after becoming smaller than the differential threshold Gads, and thereafter, is increased. This minimum value Gadp represents a maximum value of the absolute value of the decrease rate of the intake air flow. The smaller the minimum value Gadp is, the greater the maximum value of the absolute value of the decrease rate of the intake air flow is.

Figure 20:
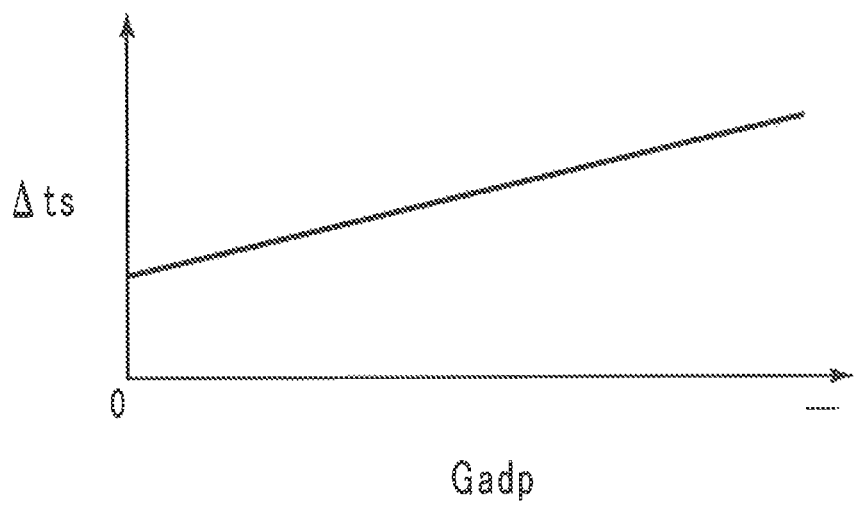
FIG. 20 is a graph illustrating a map according to a modification of the fourth example.

In this preferred example, the conducting period Δts may be changed according to the minimum value Gadp. Specifically, in accordance with a predetermined map illustrated in, for example, FIG. 20, as the minimum value Gadp (having a negative value) becomes smaller, that is, the maximum value of the absolute value of the decrease rate of the intake air flow becomes greater, the conducting period Δts is prolonged.

As the maximum value of the absolute value of the decrease rate of the intake air flow is greater, the decrease in intake air flow becomes rapider, and furthermore, it is construed that the difference ΔT in temperature becomes greater. Thus, as the maximum value of the absolute value of the decrease rate of the intake air flow is greater, the conducting period Δts is prolonged, thereby effectively suppressing an increase in difference ΔT in temperature.

In the case where the modification is applied to the routine illustrated in FIG. 19, both of the acquisition of the minimum value Gadp and the calculation and setting of the conducting period Δts corresponding to the acquired minimum value Gadp are performed at the same time in step S406. Here, the conducting period Δts may be set to a predetermined value before the acquisition of the minimum value Gadp.

The description has been given above of the first and second examples relating to the rapid increase in intake air flow and the third and fourth examples relating to the rapid decrease in intake air flow. Either of the first and second examples and either of the third and fourth examples may be carried out, or both of them may be carried out. A fifth example is briefly explained below on the combination of the first example and the third example. However, it is to be understood that other examples according to other combinations should be achieved, and furthermore, such examples are within the scope obvious to one skilled in the art.

Figure 21:
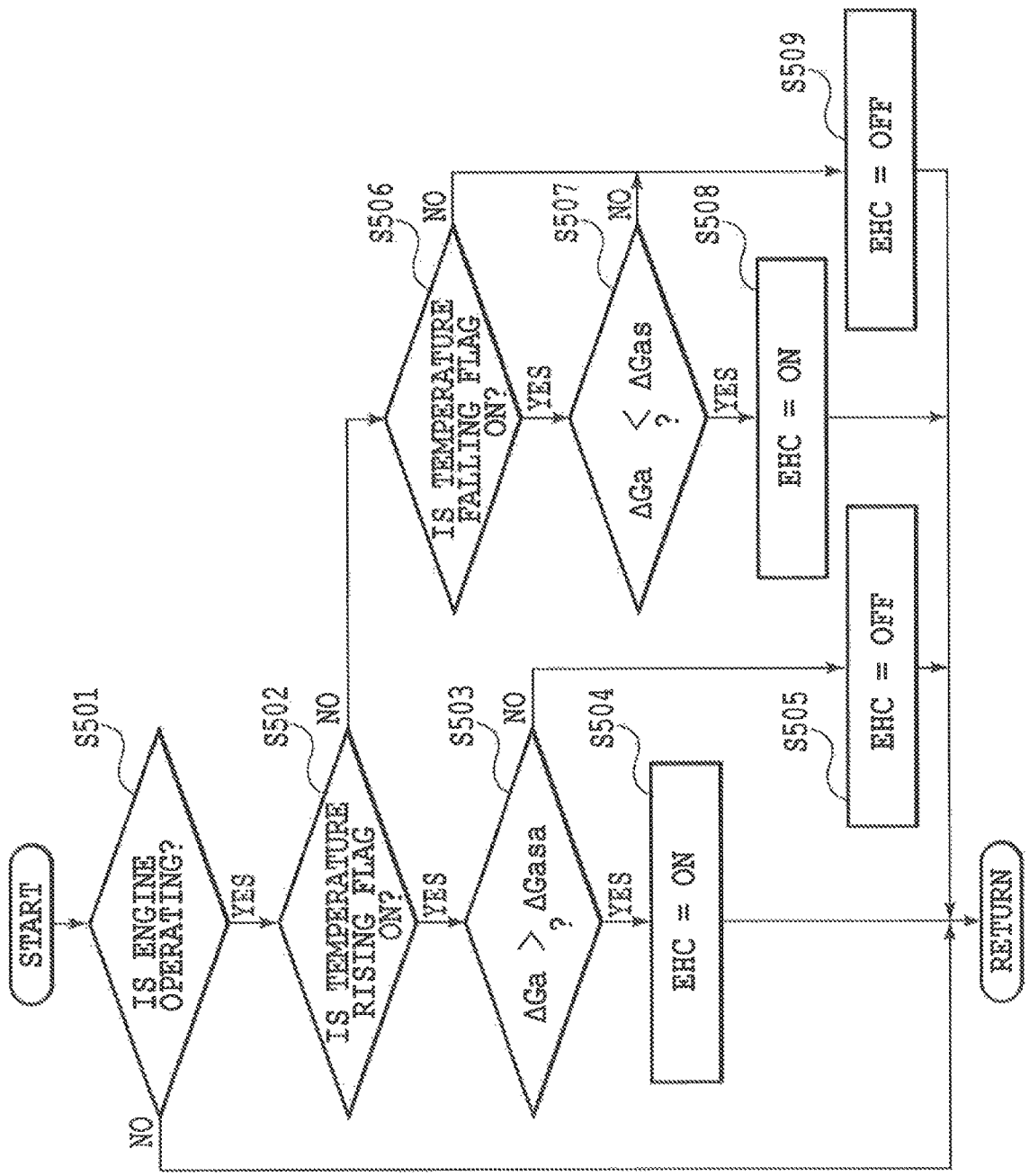
FIG. 21 is another flowchart according to a fifth example of the control in the embodiment.

Referring to FIG. 21, a control routine in the fifth example will be explained below. Steps S501 to S505 are the same as steps S101 to S105 in the first example (FIG. 11). In the case where the temperature rising flag is not ON in step S502, the control routine proceeds to step S506. Steps S506 to S509 are the same as steps S302 to S305 in the third example (FIG. 17).

Although the embodiment according to the present invention has been described above, the present invention may be achieved in other embodiments.

(1) In the above-described embodiment, the first portion P1 is referred to as the portion located above the outer peripheral surface 3a of the catalyst support 3 whereas the second portion P2 is referred to as the portion located inward in the radial direction of the support with respect to first portion P1 and in the vicinity thereof. This is because the difference in temperature between these portions is liable to become largest. Alternatively, the first portion P1 and the second portion P2 may be set to different portions. For example, the first portion P1 is referred to as a portion located inward in the radial direction of the support with respect to the outer peripheral surface 3a of the catalyst support 3 and in the vicinity thereof whereas the second portion P2 is referred to as a portion located further inward in the radial direction of the support with respect to the first portion P1 and in the vicinity thereof.

(2) The above-described numerical values are merely illustrative, and therefore, they may be appropriately changed according to actual situations or the like.

The above-described embodiments, examples, and configurations may be arbitrarily combined with each other as long as there is no contradiction. The embodiments according to the present invention include any modifications, applications, and equivalents encompassed in the idea according to the present invention defined by the scope of claims. Consequently, the present invention should not be restrictively interpreted, and therefore, the present invention may be applied to any other techniques pertaining to the scope of the idea of the present invention.

REFERENCE SIGNS LIST

1 Electric heating catalyst (EHC)
2 Exhaust passage
3 Support (catalyst support)
4 Case
5 Mat
7 Electrode
10 Internal combustion engine (engine)
12 Intake passage
13 Air flow meter
14 Throttle valve
20 Electronic control unit (ECU)
30 Battery
100 Vehicle

The invention claimed is:

1. A control device for an internal combustion engine, in which an electric heating catalyst having a catalyst support generating heat by energizing is provided to an exhaust passage, the control device comprising:
    an electronic controller configured to energize the support in the case where a rapid decrease in intake air amount of the internal combustion engine is detected, wherein the rapid decrease in intake air amount is detected when a rate of change of the intake air amount exceeds a predetermined threshold.

2. The control device for an internal combustion engine according to claim 1, wherein the electronic controller is configured to detect the rapid decrease in intake air amount based on the rate of change of the intake air amount.

3. A control device for an internal combustion engine, in which an electric heating catalyst having a catalyst support generating heat by energizing is provided to an exhaust passage, the control device comprising:
    an electronic controller configured to:
        energize the support in the case where a rapid change in intake air amount of the internal combustion engine is detected, wherein the rapid change in intake air amount is detected when a rate of change of the intake air amount exceeds a predetermined threshold; and energize the support during a predetermined conducting period from the time at which the absolute value of the rate of change of the intake air amount exceeds a predetermined rate amount.

4. The control device for an internal combustion engine according to claim 3, wherein the electronic controller is configured to change the conducting period according to the maximum value of the absolute value of the rate of change of the intake air amount.

5. A control device for an internal combustion engine, in which an electric heating catalyst having a catalyst support generating heat by energizing is provided to an exhaust passage, the control device comprising:

an electronic controller configured to:

energize the support in the case where a rapid change in intake air amount of the internal combustion engine is detected, wherein the rapid change in intake air amount is detected when a rate of change of the intake air amount exceeds a predetermined threshold; and detect the rapid change in intake air amount based on a difference between the intake air amount and a value obtained by averaging the intake air amount.

6. The control device for an internal combustion engine according to claim 5, wherein the electronic controller is configured to energize the support when the absolute value of the difference exceeds a predetermined differential threshold.

7. A control device for an internal combustion engine, in which an electric heating catalyst having a catalyst support generating heat by energizing is provided to an exhaust passage, the control device comprising:

an electronic controller configured to:

energize the support in the case where a rapid change in intake air amount of the internal combustion engine is detected, wherein the rapid change in intake air amount is detected when a rate of change of the intake air amount exceeds a predetermined threshold; and perform at least either one of:

energization to the support when a rapid increase in intake air amount is detected, a rising rate of the temperature of the support is a predetermined rate or higher, and the temperature of the support is a predetermined upper limit temperature or lower; and energization to the support when a rapid decrease in intake air amount is detected, a falling rate of the temperature of the support is a predetermined rate or higher, and the temperature of the support is a predetermined lower limit temperature or higher.

8. A control method for an internal combustion engine, in which an electric heating catalyst having a catalyst support generating heat by energizing is provided to an exhaust passage, the control method comprising:

determining whether or not an intake air amount of the internal combustion engine is rapidly decreased, wherein a rapid decrease of the intake air amount is determined when a rate of change of the intake air amount exceeds a predetermined threshold; and energizing the support in the case where it is determined that the intake air amount is rapidly decreased.

9. A control method for an internal combustion engine, in which an electric heating catalyst having a catalyst support generating heat by energizing is provided to an exhaust passage, the control method comprising:

determining whether or not an intake air amount of the internal combustion engine is rapidly changed, wherein a rapid change of the intake air amount is determined when a rate of change of the intake air amount exceeds a predetermined threshold; and energizing the support in the case where it is determined that the intake air amount is rapidly changed, wherein in the case where the absolute value of the rate of change of the intake air amount exceeds a predetermined rate amount, it is determined that the intake air amount is rapidly changed, and then, the support is energized during a predetermined conducting period from the time at the determination.

10. The control method for an internal combustion engine according to claim 9, wherein the conducting period depends upon the maximum value of the absolute value of the rate of change of the intake air amount.

11. A control method for an internal combustion engine, in which an electric heating catalyst having a catalyst support generating heat by energizing is provided to an exhaust passage, the control method comprising:

determining whether or not an intake air amount of the internal combustion engine is rapidly changed, wherein a rapid change of the intake air amount is determined when a rate of change of the intake air amount exceeds a predetermined threshold; and energizing the support in the case where it is determined that the intake air amount is rapidly changed, wherein it is determined whether or not the intake air amount is rapidly changed based on a difference between the intake air amount and a value obtained by averaging the intake air amount.

12. The control method for an internal combustion engine according to claim 11, wherein it is determined that the intake air amount is rapidly changed in the case where the absolute value of the difference exceeds a predetermined differential threshold.

13. A control method for an internal combustion engine, in which an electric heating catalyst having a catalyst support generating heat by energizing is provided to an exhaust passage, the control method comprising:

determining whether or not an intake air amount of the internal combustion engine is rapidly changed, wherein a rapid change of the intake air amount is determined when a rate of change of the intake air amount exceeds a predetermined threshold; and energizing the support in the case where it is determined that the intake air amount is rapidly changed, wherein the support is energized in the case where the rapid change in intake air amount is a rapid increase in intake air amount, a rising rate of the temperature of the support is a predetermined value or higher, and the temperature of the support is a predetermined upper limit temperature or lower.

14. A control method for an internal combustion engine, in which an electric heating catalyst having a catalyst support generating heat by energizing is provided to an exhaust passage, the control method comprising:

determining whether or not an intake air amount of the internal combustion engine is rapidly changed, wherein a rapid change of the intake air amount is determined when a rate of change of the intake air amount exceeds a predetermined threshold; and energizing the support in the case where it is determined that the intake air amount is rapidly changed, wherein the support is energized in the case where the rapid change in intake air amount is a rapid decrease in intake air amount, a falling rate of the temperature of the support is a predetermined value or higher, and the temperature of the support is a predetermined lower limit temperature or higher.

15. A control device for an internal combustion engine, in which an electric heating catalyst having a catalyst support generating heat by energizing is provided to an exhaust passage, the control device comprising:

an electronic controller configured to energize the support in the case where a rapid change in intake air amount of the internal combustion engine is detected, wherein the rapid change in intake air amount is detected when a rate of change of the intake air amount or its correlation value exceeds a predetermined threshold, wherein the electronic controller is configured to energize the support during a predetermined conducting period from the time at which the absolute value of the rate of change of the intake air amount or its correlation value exceeds a predetermined rate amount.

16. A control method for an internal combustion engine, in which an electric heating catalyst having a catalyst support generating heat by energizing is provided to an exhaust passage, the control method comprising:

determining whether or not an intake air amount of the internal combustion engine is rapidly changed, wherein a rapid change of the intake air amount is determined when a rate of change of the intake air amount or its correlation value exceeds a predetermined threshold; and energizing the support, in the case where it is determined that the intake air amount is rapidly changed, wherein in the case where the absolute value of the rate of change of the intake air amount or its correlation value exceeds a predetermined rate amount, it is determined that the intake air amount is rapidly changed, and then, the support is energized during a predetermined conducting period from the time at the determination.

* * * * *